United States Patent
Cheng

(10) Patent No.: US 11,366,544 B2
(45) Date of Patent: Jun. 21, 2022

(54) TOUCH SCHEME WITH AN INTERNAL CAPACITOR REDUCTION METHOD

(71) Applicant: Novatek Microelectronics Corp., Hsinchu (TW)

(72) Inventor: Yen-Cheng Cheng, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/882,740

(22) Filed: May 25, 2020

(65) Prior Publication Data

US 2021/0096684 A1  Apr. 1, 2021

Related U.S. Application Data

(60) Provisional application No. 62/906,743, filed on Sep. 27, 2019.

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04107* (2013.01); *G06F 2203/04111* (2013.01)

(58) Field of Classification Search
CPC . G06F 2203/04107; G06F 2203/04111; G06F 3/0412; G06F 3/0416; G06F 3/044
See application file for complete search history.

(56) References Cited

U.S. PATENT DOCUMENTS

| | | | | |
|---|---|---|---|---|
| 2013/0093706 A1* | 4/2013 | Kurasawa | ............ | G09G 3/2074 345/173 |
| 2013/0229224 A1* | 9/2013 | Ho | ........................ | H03K 17/962 327/517 |
| 2014/0125357 A1* | 5/2014 | Blondin | ............. | G01R 27/2605 324/658 |
| 2014/0267165 A1* | 9/2014 | Roziere | ................. | G06F 3/0443 345/174 |
| 2015/0233989 A1* | 8/2015 | Chou | ................. | G01R 27/2605 345/174 |

(Continued)

FOREIGN PATENT DOCUMENTS

| | | |
|---|---|---|
| CN | 106873818 | 6/2017 |
| CN | 106873819 | 6/2017 |

(Continued)

OTHER PUBLICATIONS

"Office Action of Taiwan Counterpart Application", dated Feb. 8, 2021, p. 1-p. 7.

*Primary Examiner* — Hong Zhou
(74) *Attorney, Agent, or Firm* — JCIPRNET

(57) ABSTRACT

A driver chip including a receiving structure, a shielding structure, and a touch control circuit is provided. The receiving structure can receive a touch sensing signal. The shielding structure can be disposed aside the receiving structure. The shielding structure can shield at least one parasitic capacitor coupled to the receiving structure. The touch control circuit can be connected to the receiving structure and configured to receive the touch sensing signal. An electronic device including a driver chip is also provided.

35 Claims, 22 Drawing Sheets

(56) References Cited

U.S. PATENT DOCUMENTS

| | | | | |
|---|---|---|---|---|
| 2015/0338958 A1* | 11/2015 | Decaro | ............... | G06F 3/04182 |
| | | | | 345/174 |
| 2017/0315646 A1* | 11/2017 | Roziere | ................. | G06F 3/0443 |
| 2018/0060637 A1* | 3/2018 | Chao | ................... | G06K 9/00053 |
| 2019/0102037 A1* | 4/2019 | Krah | ...................... | G06F 3/0418 |
| 2020/0033979 A1* | 1/2020 | Sauer | .................... | G06F 3/0418 |
| 2020/0161973 A1* | 5/2020 | Fukushima | ............ | H02M 3/158 |

FOREIGN PATENT DOCUMENTS

| | | |
|---|---|---|
| CN | 109564485 | 4/2019 |
| TW | 201640417 | 11/2016 |
| TW | 201820099 | 6/2018 |

\* cited by examiner

TOUCH SCHEME WITH AN INTERNAL CAPACITOR REDUCTION METHOD

CROSS-REFERENCE TO RELATED APPLICATION

This application claims the priority benefit of U.S. Provisional application Ser. No. 62/906,743, filed on Sep. 27, 2019. The entirety of the above-mentioned patent application is hereby incorporated by reference herein and made a part of this specification.

BACKGROUND

Technical Field

The invention generally relates to a driver chip. More particularly, the invention relates to a driver chip for driving a touch sensor.

Description of Related Art

An integrated circuit (IC) for touch sensing detects a touch event on a touch sensor by detecting the capacitance change. However, the parasitic capacitance of the internal trace of the IC causes the detected capacitance value to be an erroneous signal. Furthermore, the noise may be transmitted into the IC via the parasitic capacitance.

Metal layers inside the IC may generate parasitic capacitance. Parasitic capacitance may be also be generated between the metal layers and the substrate and between bumps of the IC and the metal layers. Thus, the parasitic capacitance generated by these components of the IC affects the touch sensing result.

SUMMARY

Accordingly, to address the above described difficulty, the invention provides a driver chip configured to drive a touch sensor using a touch scheme with an internal parasitic capacitance reduction method.

In one of the embodiments, a driver chip includes a receiving structure, a shielding structure, and a touch control circuit. The receiving structure is configured to receive a touch sensing signal. The shielding structure is disposed aside the receiving structure. The shielding structure is configured to shield at least one parasitic capacitor coupled to the receiving structure. The touch control circuit is connected to the receiving structure. The touch control circuit is configured to receive the touch sensing signal from the receiving structure.

In one of the embodiments, the electronic device includes a touch sensor and a driver chip. The driver chip is coupled to the touch sensor. The driver chip includes a receiving structure, a shielding structure, and a touch control circuit. The receiving structure is configured to receive a touch sensing signal. The shielding structure is disposed aside the receiving structure. The shielding structure is configured to shield at least one parasitic capacitor coupled to the receiving structure. The touch control circuit is connected to the receiving structure. The touch control circuit is configured to receive the touch sensing signal from the receiving structure.

To make the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
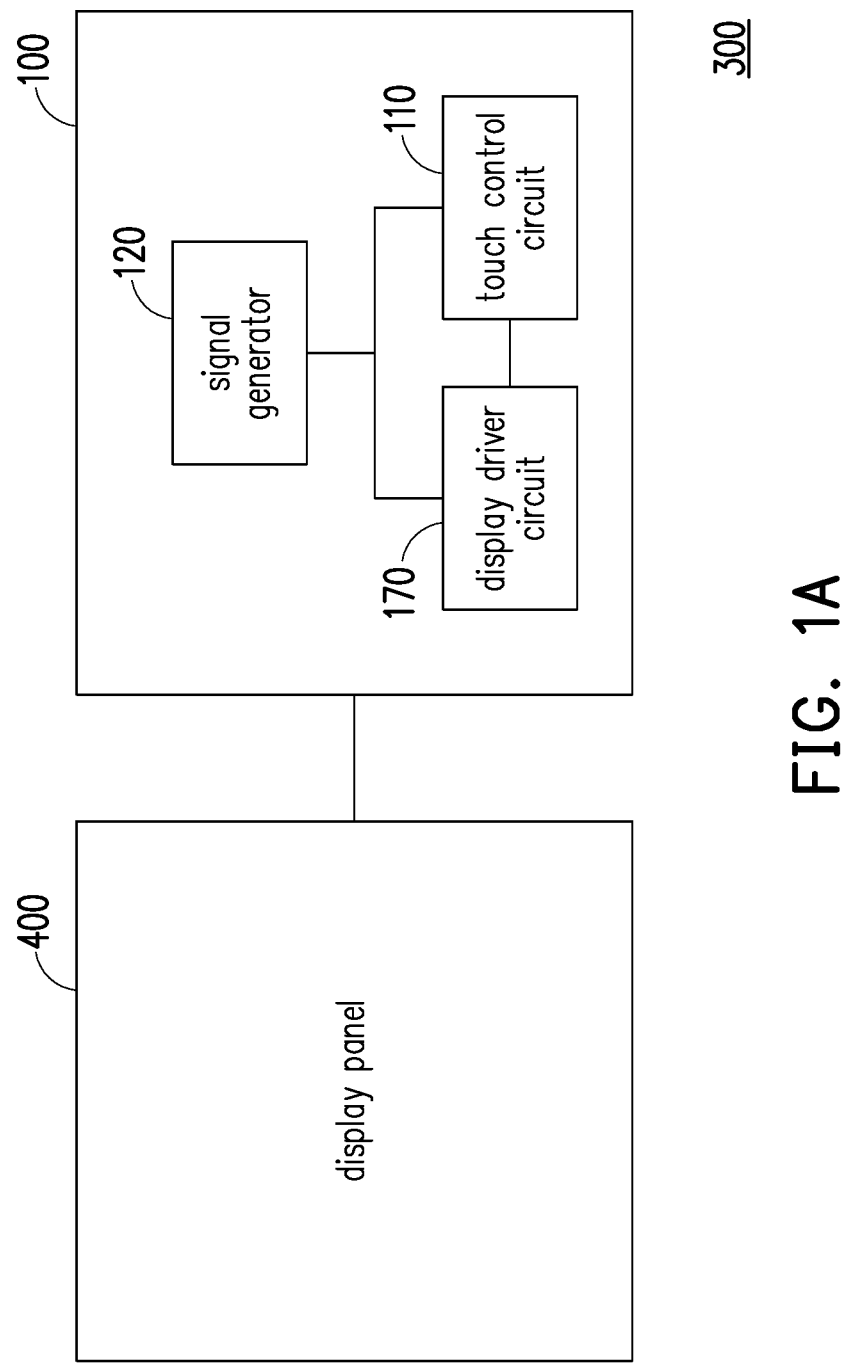
FIG. 1A is a schematic diagram illustrating an electronic device according to an embodiment of the invention.

It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected", "coupled", and variations thereof herein are used broadly and encompass direct and indirect connections and couplings.

Reference will now be made in detail to the present exemplary embodiments of the invention, examples of which are illustrated in the accompanying drawings. Wherever possible, the same reference numbers are used in the drawings and the description to refer to the same or like parts.

Figure 1B:
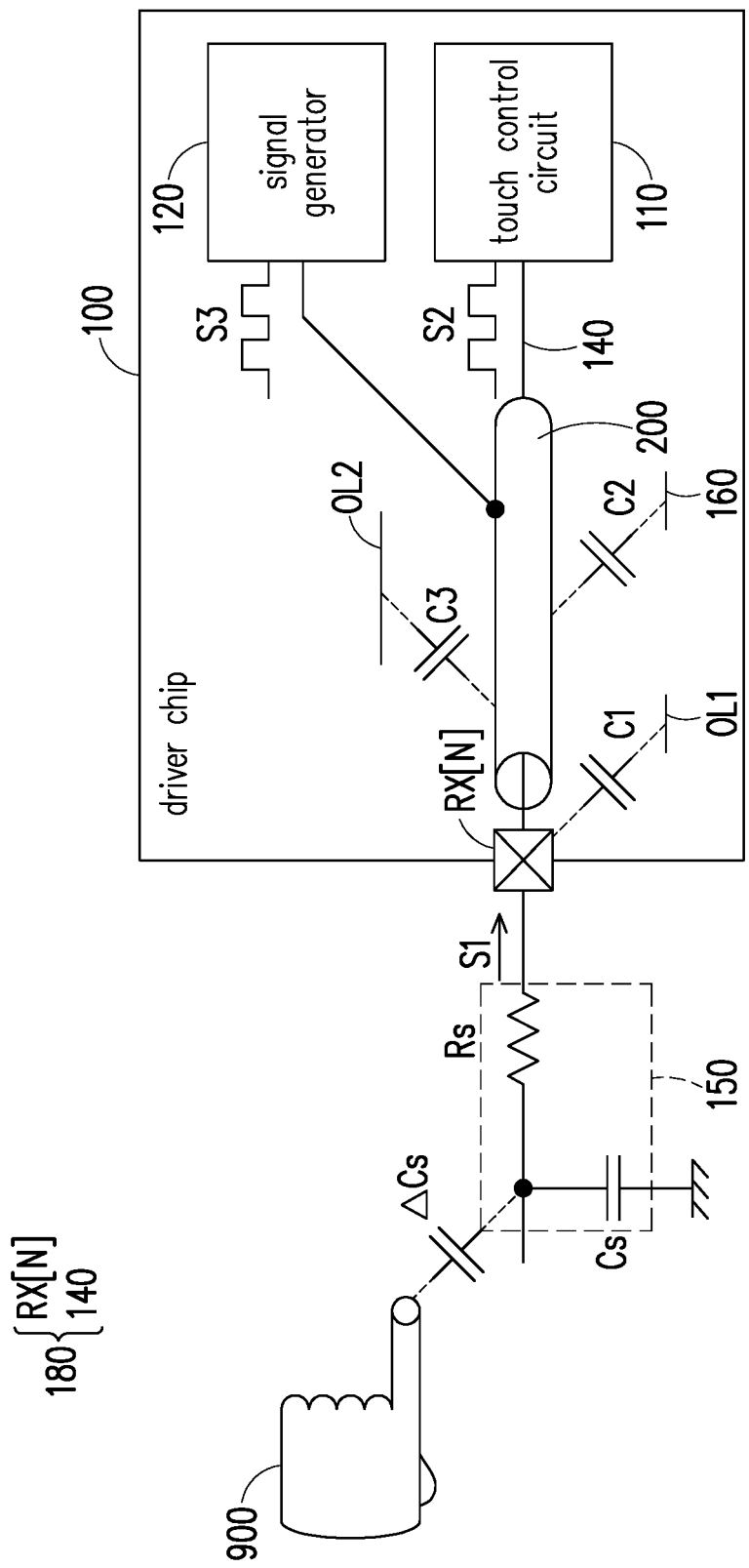
FIG. 1B is a schematic diagram illustrating a driver chip according to an embodiment of the invention.

FIG. 1A is a schematic diagram illustrating an electronic device according to an embodiment of the invention. FIG. 1B is a schematic diagram illustrating a driver chip according to an embodiment of the invention. Referring to FIG. 1A and FIG. 1B, the electronic device 300 includes a display panel 400 and a driver chip 100. The display panel 400 is coupled to the driver chip 100. In the present embodiment, the display panel 400 may be a touch display panel including one or more touch sensors 150.

The driver chip 100 includes a receiving structure 180, a shielding structure 200, and a touch control circuit 110. The driver chip 100 can further include a signal generator 120 and a display driver circuit 170. The display driver circuit 170 is configured to control the display panel 400 to display images. The receiving structure 180 can include at least one of a receiving terminal RX[N] and a sensing line 140. The receiving terminal RX[N] is configured to be coupled to the touch sensor 150 external to the driver chip 100 and receive a touch sensing signal S1 from the touch sensor 150. The touch sensor 150 may be equivalent to a capacitor Cs and a resistor Rs. The touch sensor 150 may be disposed outside of the chip. The driver chip 100 can drive the touch sensor 150 to sense a capacitance variation ΔCs corresponding to a touch event and receives the touch sensing signal S1 indicating the capacitance variation ΔCs. The touch event may be a user's finger 900 that performs a touch operation on the touch sensor, for example. The touch sensor 150 may be implemented in or on or with various types of panels such as a touch panel or a touch display panel. The driver chip may be a touch control chip dedicated for touch controlling or a touch display driver chip capable of controlling a touch display panel. The driver chip may further perform various functions according to design requirements.

The receiving terminal RX[N] is configured to receive the touch sensing signal S1 from the touch sensor 150 during a touch sensing phase. In an embodiment, the receiving terminal RX[N] includes a bump of the driver chip 100. The sensing line 140 is connected to the receiving terminal RX[N]. The sensing line 140 is configured to transmit the touch sensing signal S1 to the touch control circuit 110. The touch sensing signal S1 can be transmitted through the sensing line 140 to the touch control circuit 110.

In the present embodiment, one or more different parasitic capacitors may exist within the driver chip 100. For example, the driver chip 100 may further include a first metal line OL1 (at least one metal line) other than the sensing line 140, such as a power line, a ground line or a signal line for transmitting any signal utilized in the driver chip 100. For example, the driver chip may be a touch display driver chip and the signal line may be a data line configured to transmit display data for driving a display panel or a touch display panel to display images. The first metal line OL1 can be deemed as an interference element and serve as the first terminal of the parasitic capacitor C1, and the receiving terminal RX[N] serves as the second terminal of the parasitic capacitor C1. In other words, the parasitic capacitor C1 is generated between the receiving terminal RX[N] and the first metal line OL1, causing inaccuracy to the touch sensing signal S1.

In the same or alternative embodiment, the driver chip 100 may include a semiconductor substrate 160, which can be deemed as an interference element and serves as the first terminal of the parasitic capacitor C2. The sensing line 140 serves as the second terminal of the parasitic capacitor C2. In other words, the parasitic capacitor C2 is generated between the sensing line 140 and the semiconductor substrate 160, causing inaccuracy to the touch sensing signal S1.

In the same or alternative embodiment, the driver chip 100 may include a second metal line OL2 (at least one metal line) other than the sensing line 140, such as a power line, a ground line or a signal line. The signal line may be a data line configured to transmit display data for driving a display panel or a touch display panel to display images. The second metal line OL2 can be deemed as an interference element and serve as the first terminal of the parasitic capacitor C3, and the sensing line 140 serves as the second terminal of the parasitic capacitor C3. In other words, the parasitic capacitor C3 is generated between the sensing line 140 and the second metal line OL2, causing inaccuracy to the touch sensing signal S1.

The shielding structure 200 may be disposed aside the receiving structure 180, i.e., either or both of the receiving terminal RX[N] and the sensing line 140. The shielding structure 200 may be configured to shield at least one parasitic capacitor C1, C2, C3 coupled to the receiving structure 180, i.e., at least one of the receiving terminal RX[N] and the sensing line 140. In the embodiment, the shielding structure 200 is exemplarily shown as having a rounding structure surrounding at least a part of the sensing line 140. This can reduce the effects of parasitic capacitances C2 and C3.

The touch control circuit 110 is connected to receiving structure 180, for example, the sensing line 140. The touch control circuit 110 can receive the touch sensing signal S1 from the receiving structure 180. The signal generator 120 can be connected to the shielding structure 200. The signal generator 120 may be implemented within the touch control circuit 110 or outside the touch control circuit 110. The signal generator 120 may be integrated with the touch control circuit 110 or separated from the touch control circuit 110.

In an implementation of a self-capacitance structure, the touch control circuit 110 may be configured to apply a driving signal S2 to the sensing line 140 during the touch sensing phase. The signal generator 120 is configured to apply a synchronization signal S3 synchronous with driving signal S2 to the shielding structure 200 during the touch sensing phase. A voltage difference between the synchronization signal S3 and the driving signal S2 may be constant at least during the touch sensing phase. The synchronization signal S3 may have a frequency and a phase the same as those of the driving signal S2. A level of the synchronization signal S3 can be the same as or different from that of the driving signal S2. The synchronization signal S3 may be the same signal as the driving signal S2 or be a different signal from the driving signal.

In an implementation of a mutual-capacitance structure, the touch control circuit 110 may be configured to apply a driving signal S2 to a driving line (not shown) during a touch sensing phase. The driving line may be a touch scan line different from the sensing line 140, used for transmitting a touch driving signal. The signal generator 120 can be configured to apply a direct-current (DC) signal to the shielding structure. The DC signal can have a voltage level substantially the same as that of the touch sensing signal.

It is noted that in other embodiments, the shielding structure 200 can have any structure capable of shielding at least one of the parasitic capacitors C1, C2 and C3 coupled to at least one of the receiving terminal RX[N] and the sensing line 140. The shielding structure 200 may include at least a part arranged between two terminals of any of the parasitic capacitor C1, C2 or C3 and therefore is not limited to having the shape illustrated in FIG. 1B.

Regarding hardware structures of the components in the embodiment of FIG. 1B, the touch control circuit 110 may be a processor having computational capability. Alternatively, the touch control circuit 110 and the signal generator 120 may be designed through hardware description languages (HDL) or any other design methods for digital circuits familiar to people skilled in the art and may be hardware circuits implemented through a field programmable gate array (FPGA), a complex programmable logic device (CPLD), or an application-specific integrated circuit (ASIC). In addition, enough teaching, suggestion, and implementation illustration for hardware structures of the touch control circuit 110 and the signal generator 120 can be obtained with reference to common knowledge in the related art, which is not repeated hereinafter.

Figure 2:
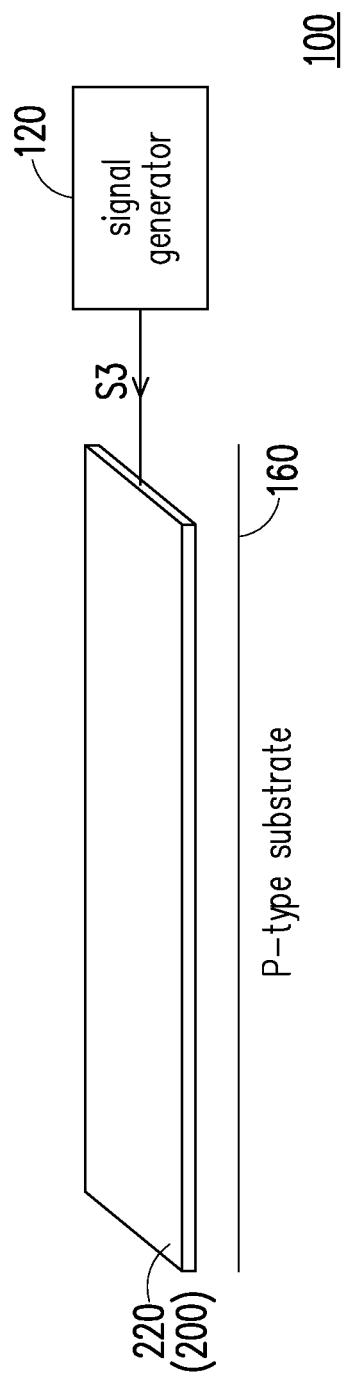
FIG. 2 is a schematic diagram illustrating a layer structure of a driver chip according to an embodiment of the invention.

FIG. 2 is a schematic diagram illustrating a layer structure of a driver chip according to an embodiment of the invention. Referring to FIG. 2, the shielding structure 200 of the present embodiment includes a first metallic pattern 220 disposed above a semiconductor substrate 160, which is exemplarily shown as a P-type substrate but the disclosure is not limited thereto. The first metallic pattern 220 is connected to the signal generator 120.

In an implementation of a self-capacitance structure, the signal generator 120 can be configured to apply the synchronization signal S3 to the first metallic pattern 220 for shielding a parasitic capacitor generated between the semiconductor substrate 160 and the sensing line 140. A voltage difference between the synchronization signal S3 and the driving signal (not shown, applied to the sensing line 140) may be constant at least during a touch sensing phase during which the driving signal is applied to the sensing line 140. The synchronization signal S3 may have a frequency and a phase the same as those of the driving signal. A level of the synchronization signal S3 can be the same as or different from that of the driving signal S2. The synchronization signal S3 may be the same signal as the driving signal S2 or be a different signal from the driving signal.

Alternatively, in an implementation of a mutual-capacitance structure, the touch control circuit 110 may be configured to apply a driving signal S2 to a driving line (not shown) during a touch sensing phase. The driving line may be a touch scan line different from the sensing line 140, used for transmitting a touch driving signal. The signal generator 120 can be configured to apply a direct-current (DC) signal to the shielding structure. The DC signal can have a voltage level substantially the same as that of the touch sensing signal.

In different embodiments, one or more shielding structures similar to the structure of the first metallic pattern 220 can be implemented, each arranged to have at least a part located between two terminals of any of the parasitic capacitor C1, C2 or C3. Details of the shielding structure 220 can be analogized from the descriptions of the shielding structure 200 in FIG. 1B and are thus omitted for brevity.

Figure 3:
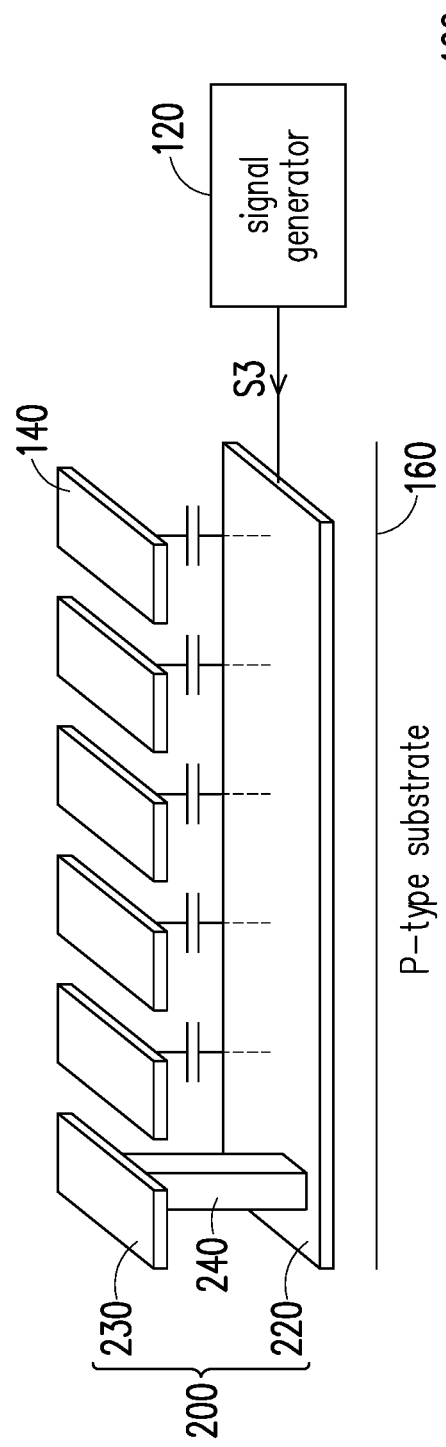
FIG. 3 is a schematic diagram illustrating a layer structure of a driver chip according to another embodiment of the invention.

FIG. 3 is a schematic diagram illustrating a layer structure of a driver chip according to another embodiment of the invention. Referring to FIG. 3, the shielding structure 200 of the present embodiment includes a first metallic pattern 220. In the present embodiment, the first metallic pattern 220 is disposed on one side of the sensing line 140, and the semiconductor substrate 160 is also disposed on the same side of the sensing line 140. In other words, the first metallic pattern 220 is disposed between the sensing line 140 and the semiconductor substrate 160. The first metallic pattern 220 can be implemented by a metal layer (a first metal layer) closest to the semiconductor substrate 160. The first metallic pattern 220 can be connected to the signal generator 120.

In an implementation of a self-capacitance structure, the signal generator 120 can be configured to apply the synchronization signal S3 to the first metallic pattern 220. The first metallic pattern 220 applied with the synchronization signal S3 can shield a parasitic capacitor generated between the sensing line 140 and the semiconductor substrate 160. Alternatively, in an implementation of a mutual-capacitance structure, the signal generator 120 can be configured to apply a DC signal to the first metallic pattern 220.

In some implementations, the driver chip 100 can further comprise a third metallic pattern 230, which may be connected to the first metallic pattern 220 by a first via 240. The first metallic pattern 220 can be also connected to the signal generator 120. In other words, the signal generator 120 is configured to apply the synchronization signal S3/the DC signal to either or both of the first metallic pattern 220 and third metallic pattern 230.

Figure 4:
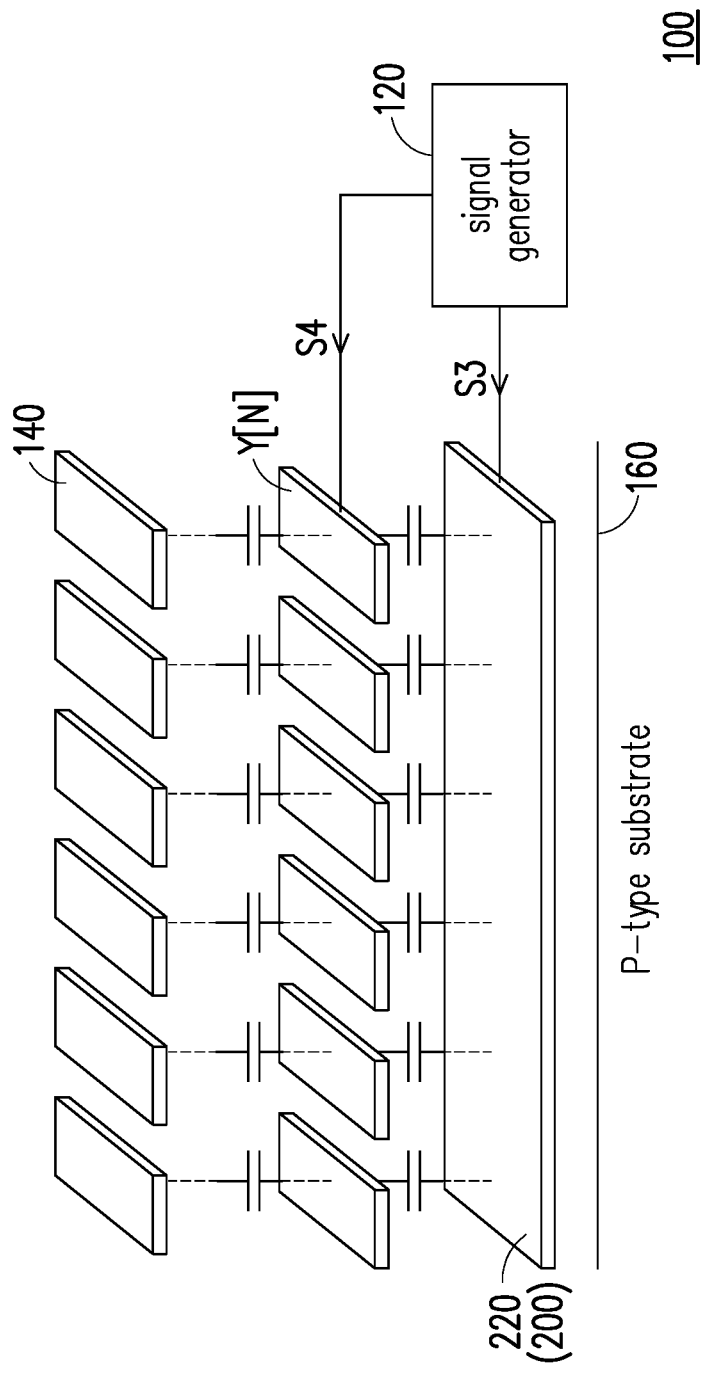
FIG. 4 is a schematic diagram illustrating a layer structure of a driver chip according to another embodiment of the invention.

FIG. 4 is a schematic diagram illustrating a layer structure of a driver chip according to another embodiment of the invention. Referring to FIG. 4, the driver chip 100 of the present embodiment further includes at least one metal line Y[N] compared to the layer structure shown in FIG. 3. In the present embodiment, the first metallic pattern 220 is disposed on one side of the sensing line 140, and the at least one metal line Y[N] is also disposed on the same side of the sensing line 140. Each of the metal lines Y[N] are disposed between the sensing line 140 and the first metallic pattern 220. The metal lines Y[N] are implemented as a different metal layer from that of the first metallic pattern 220. The at least one metal line Y[N] can be any at least one metal line other than the sensing line 140, such as a power line, a ground line or a signal line. For example, the metal line Y[N] may be a data line configured to transmit display data for driving a display panel or a touch display panel to display images.

In some implementations, the signal generator 120 may configured to further apply a signal S4 to the at least one metal line Y[N] if appropriate. A voltage difference between the signal S4 and the driving signal (not shown, applied to the sensing line 140) may be constant at least during a touch sensing phase during which the driving signal S2 is applied to the sensing line 140. The signal S4 may have the same frequency and the same phase as those of the driving signal S2. The at least one metal line Y[N] applied with the signal S4 may cooperate with the first metallic pattern 220 to shield a parasitic capacitor generated between the sensing line 140 and the semiconductor substrate 160. A level of the signal S4 can be the same as or different from that of the driving signal S2.

Different modifications may be made to the embodiment of FIG. 4. For example, in an alternative embodiment, the location of the sensing line and the location of the at least one metal line Y[N] can be replaced with each other. The at least one metal line Y[N] may not shield the parasitic capacitor generated between the sensing line 140 and the semiconductor substrate 160. However, if there are more other metal lines arranged farther away from the semiconductor 160, which means that the metal line Y[N] is located between the more other farther metal lines and the sensing line 140. Then, the at least one metal line Y[N] applied with the signal S4 may shield a parasitic capacitor generated between the sensing line 140 and the more other farther metal lines.

Figure 5:
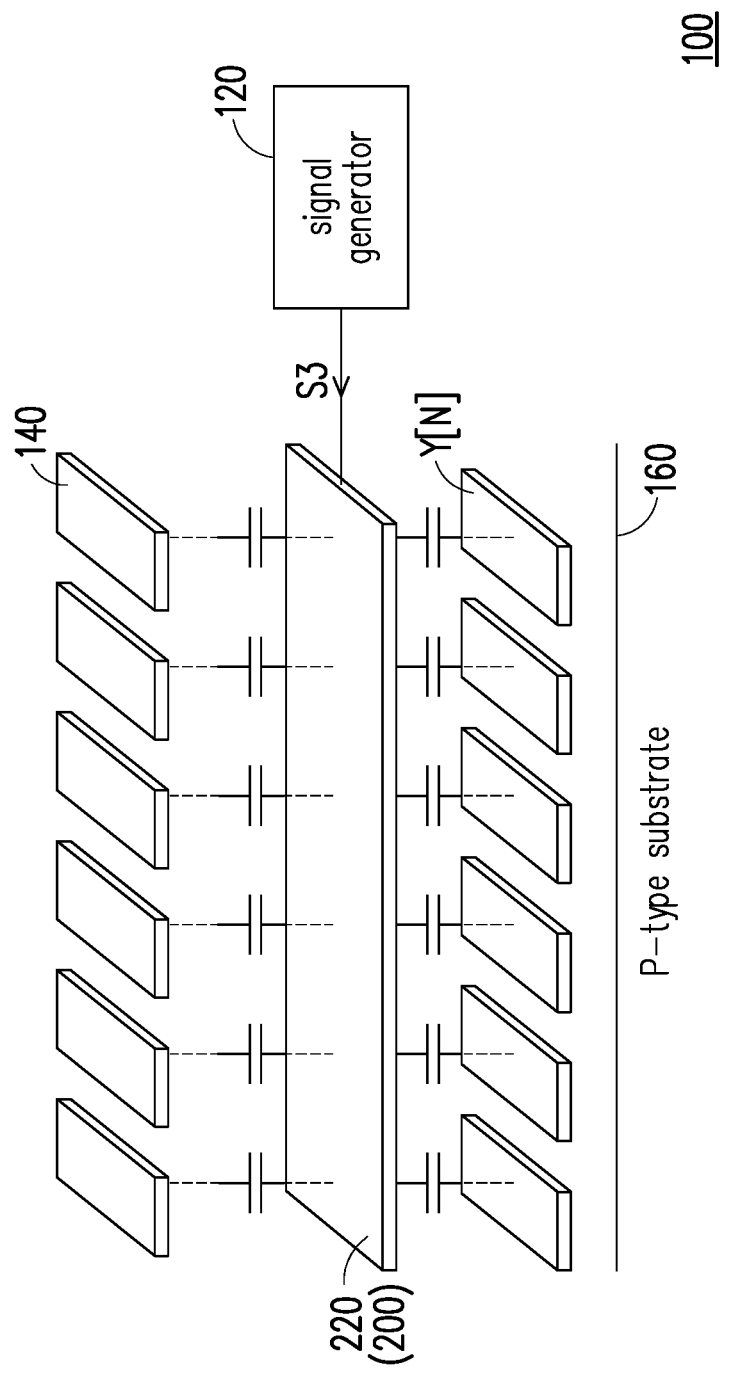
FIG. 5 is a schematic diagram illustrating a layer structure of a driver chip according to another embodiment of the invention.

FIG. 5 is a schematic diagram illustrating a layer structure of a driver chip according to another embodiment of the invention. FIG. 5 differs from FIG. 4 mainly in that the locations of the at least one metal line Y[N] and the first metallic pattern 220 are replaced with each other. Referring to FIG. 5, in the present embodiment, the first metallic pattern 220 and the at least one metal line Y[N] are disposed on the same side of the sensing line 140. The first metallic pattern 220 can be disposed between the sensing line 140 and the at least one metal line Y[N]. The metal lines Y[N] are implemented as a different metal layer from that of the first metallic pattern 220. The at least one metal line Y[N] can be any at least one metal line other than the sensing line 140, such as a power line, a ground line or a signal line. For example, the metal line Y[N] may be a data line configured to transmit display data for driving a display panel or a touch display panel to display images. Accordingly, the first metallic pattern 220 can shield parasitic capacitance coupled between the sensing line 140 and the semiconductor substrate 160, and also shield parasitic capacitance coupled between the sensing line 140 and the metal line Y[N].

In some implementations, the signal generator 120 can be configured to further apply a signal S4 to the metal line Y[N] if appropriate. A voltage difference between the signal S4 and the driving signal (not shown, applied to the sensing line 140) may be constant at least during a touch sensing phase during which the driving signal S2 is applied to the sensing line 140. The signal S4 may have the same frequency and the same phase as those of the driving signal. The metal line Y[N] applied with the signal S4 may cooperate with the first metallic pattern 220 to shield a parasitic capacitor generated between the sensing line 140 and the semiconductor substrate 160. A level of the signal S4 can be the same as or different from that of the driving signal.

Different modifications may be made to the embodiment of FIG. 5. For example, in an alternative embodiment, the location of the sensing line and the location of the at least one metal line Y[N] can be replaced with each other. The first metallic pattern 220 may not shield the parasitic capacitor generated between the sensing line 140 and the semiconductor substrate 160. However, the first metallic pattern 220 may not shield the parasitic capacitor generated between the sensing line 140 and the metal line Y[N]. In addition, if there are more other metal lines arranged farther away from the semiconductor 160, which means that the metal line Y[N] is located between the more other farther metal lines and the first metallic pattern 220. Then, the first metallic pattern 220 and/or the at least one metal line Y[N] applied with the signal S4 may shield a parasitic capacitor generated between the sensing line 140 and the more other farther metal lines.

Figure 6:
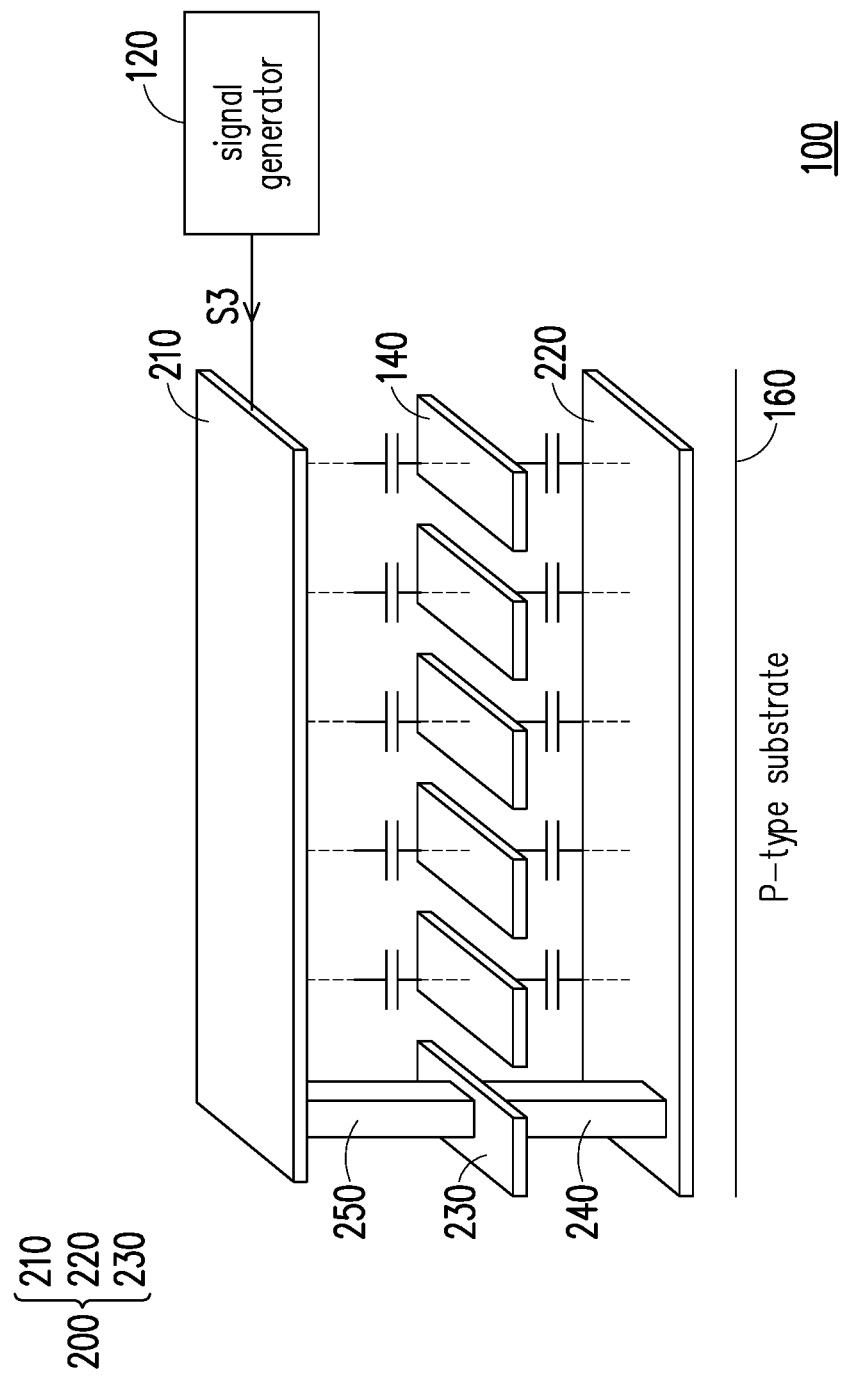
FIG. 6 is a schematic diagram illustrating a layer structure of a driver chip according to another embodiment of the invention.

FIG. 6 is a schematic diagram illustrating a layer structure of a driver chip according to another embodiment of the invention. FIG. 6 differs from FIG. 3 mainly in addition of the second metallic pattern 210 for more shielding effect. Referring to FIG. 6, the shielding structure 200 of the present embodiment includes the first metallic pattern 220, the second metallic pattern 210. In the present embodiment, the second metallic pattern 210 is disposed on the other side of the sensing line 140, and the first metallic pattern 220 is implemented by a metal layer closest to the semiconductor substrate 160. In some implementations, the shielding structure 200 may further include a third metallic pattern 230, which can be further connected to the first metallic pattern 220 by a first via 240 and/or the second metallic pattern 210 by a second via 250. The second metallic pattern 210 can be connected or coupled to the signal generator 120. The third metallic pattern 230 and the sensing line 140 are disposed in the same layer.

In an implementation of a self-capacitance structure, a signal generator 120 is configured to apply the synchronization signal S3 to one or more of the first metallic pattern 220, the second metallic pattern 210 and the third metallic pattern 230. The first metallic pattern 220 applied with the synchronization signal S3 can shied parasitic capacitances between the sensing line 140 and the semiconductor substrate 160. In addition, the second metallic pattern 210 applied with the synchronization signal S3 can shield parasitic capacitance generated between the sensing line 140 and other metal lines (not shown) disposed above the second metallic pattern 210 and farther away from the sensing line 140 than the second metallic pattern 210. In an implementation of a mutual-capacitance structure, the synchronization signal S3 can be replaced with a DC signal.

Figure 7:
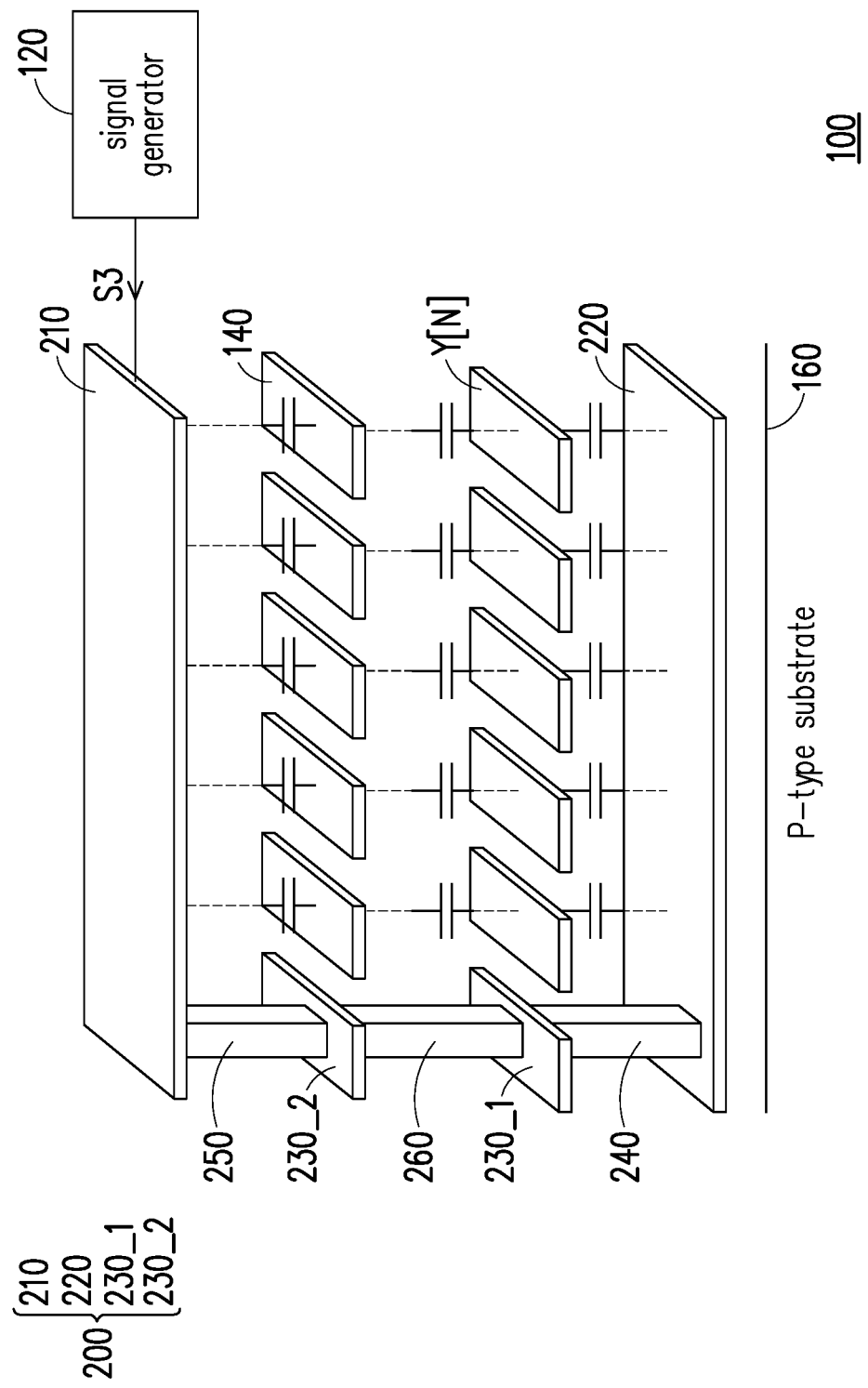
FIG. 7 is a schematic diagram illustrating a layer structure of a driver chip according to another embodiment of the invention.

FIG. 7 is a schematic diagram illustrating a layer structure of a driver chip according to another embodiment of the invention. FIG. 7 differs from FIG. 4 mainly in addition of the second metallic pattern 210 for more shielding effect. Referring to FIG. 7, in the present embodiment, the driver chip 100 further includes at least one metal line Y[N], and the shielding structure 200 includes the first metallic pattern 220 and the second metallic pattern 210. The at least one metal line Y[N] can be implemented as different metal layers from the first metallic pattern 220 and the second metallic pattern 210. Each of the metal lines Y[N] can be disposed between the sensing line 140 and the first metallic pattern 220. The at least one metal line Y[N] can be any at least one metal line other than the sensing line 140, such as a power line, a ground line or a signal line. For example, the metal line Y[N] may be a data line configured to transmit display data for driving a display panel or a touch display panel to display images.

In some implementations, the shielding structure 200 may further include the third metallic patterns 230_1 and 230_2. The third metallic pattern 230_1 is connected to the first metallic pattern 220 by the first via 240. The third metallic pattern 230_2 is connected to the second metallic pattern 210 by the second via 250. The third metallic pattern 230_1 is connected to the third metallic pattern 230_2 by the third via 260.

In an implementation of a self-capacitance structure, a signal generator 120 is configured to apply the synchronization signal S3 to one or more of the first metallic pattern 220, the second metallic pattern 210 and the third metallic patterns 230_1 and 230_2. In an implementation of a mutual-capacitance structure, the synchronization signal S3 can be replaced with the DC signal.

The first metallic pattern 220 applied with the synchronization signal S3 can shied parasitic capacitances between the sensing line 140 and the semiconductor substrate 160. In addition, the second metallic pattern 210 applied with the synchronization signal S3 can shield parasitic capacitance generated between the sensing line 140 and other metal lines (not shown) disposed above the second metallic pattern 210 and farther away from the sensing line 140 than the second metallic pattern 210.

In an embodiment under the self-capacitance structure, the signal generator 120 or a different pulse generator can be configured to further apply a signal S4 to the metal line Y[N] if appropriate. A voltage difference between the signal S4 and the driving signal (not shown, applied to the sensing line 140) may be constant at least during a touch sensing phase during which the driving signal S2 is applied to the sensing line 140. The signal S4 may have the same frequency and the same phase as those of the driving signal. A level of the signal S4 can be the same as or different from that of the driving signal S2. The metal line Y[N] applied with the signal can further cooperate with the first metallic pattern 220 to shield parasitic capacitors generated between the sensing line 140 and the semiconductor substrate 160. In an implementation of a mutual-capacitance structure, the signal S4 can be replaced with the DC signal.

Figure 8:
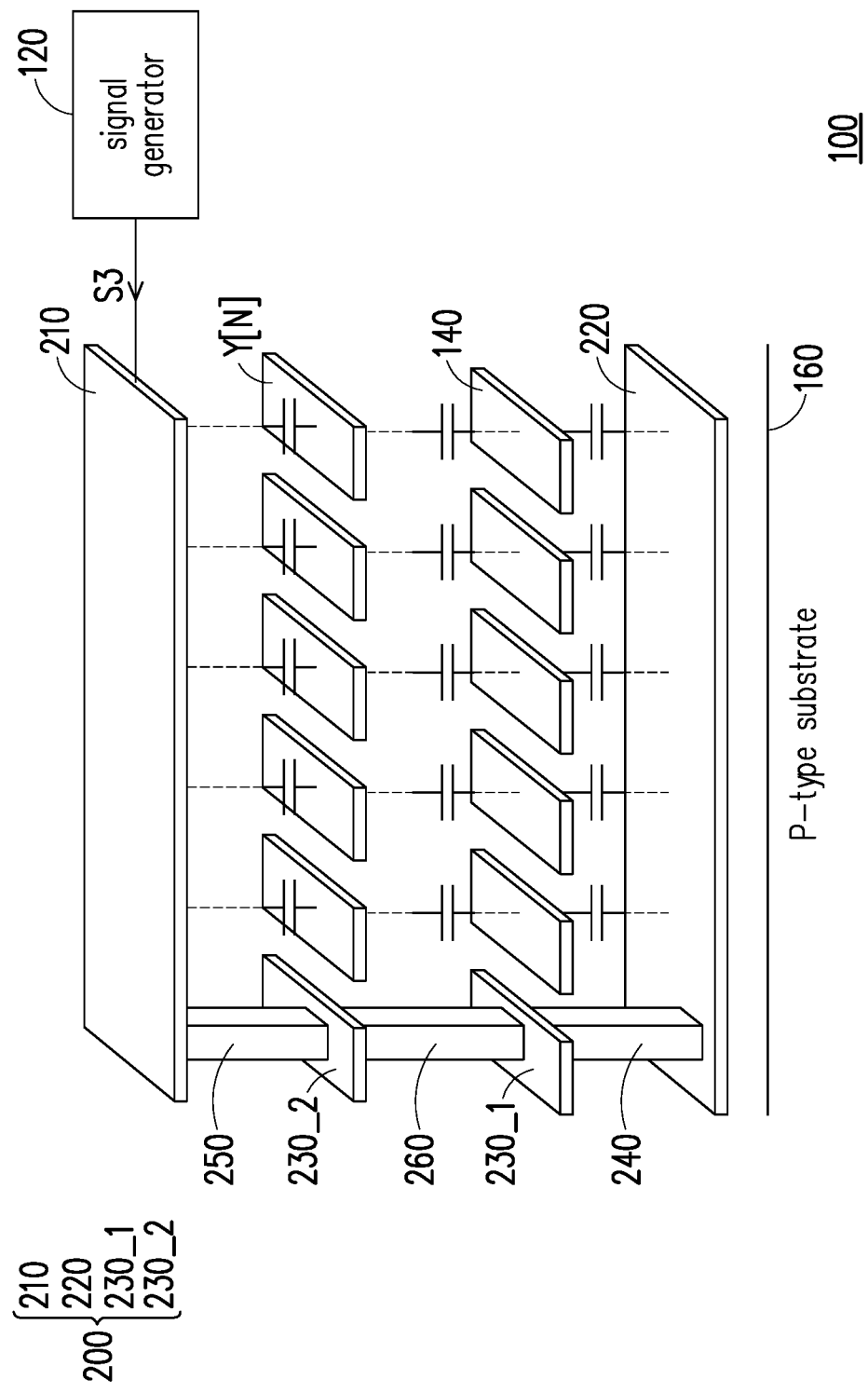
FIG. 8 is a schematic diagram illustrating a layer structure of a driver chip according to another embodiment of the invention.

FIG. 8 is a schematic diagram illustrating a layer structure of a driver chip according to another embodiment of the invention. Referring to FIG. 8, FIG. 8 is similar to FIG. 7, and the main difference lies in that the location of the metal line Y[N] and the location of the sensing line are replaced with each other. In other words, each of the metal lines Y[N] are disposed between the sensing line 140 and the second metallic pattern 210.

In an implementation of a self-capacitance structure, the first metallic pattern 220 applied with the synchronization signal S3 can shied parasitic capacitances between the sensing line 140 and the semiconductor substrate 160. In addition, the second metallic pattern 210 applied with the synchronization signal S3 can shield parasitic capacitance generated between the sensing line 140 and other metal lines (not shown) disposed above the second metallic pattern 210 and farther away from the sensing line 140 than the second metallic pattern 210. In an implementation of a mutual-capacitance structure, the synchronization signal S3 can be replaced with a DC signal.

In an embodiment under the self-capacitance structure, the signal generator 120 or a different pulse generator can be configured to further apply a signal S4 to the metal line Y[N] if appropriate. A voltage difference between the signal S4 and the driving signal (not shown, applied to the sensing line 140) may be constant at least during a touch sensing phase during which the driving signal S2 is applied to the sensing line 140. The signal S4 may have the same frequency and the same phase as those of the driving signal. A level of the signal S4 can be the same as or different from that of the driving signal S2. The metal line Y[N] applied with the signal can further cooperate with the second metallic pattern 210 to shield parasitic capacitors generated between the sensing line 140 and other metal lines (not shown) disposed above the second metallic pattern 210 and farther away from the sensing line 140 than the second metallic pattern 210. In an implementation of a mutual-capacitance structure, the S4 can be replaced with the DC signal.

Figure 9A:
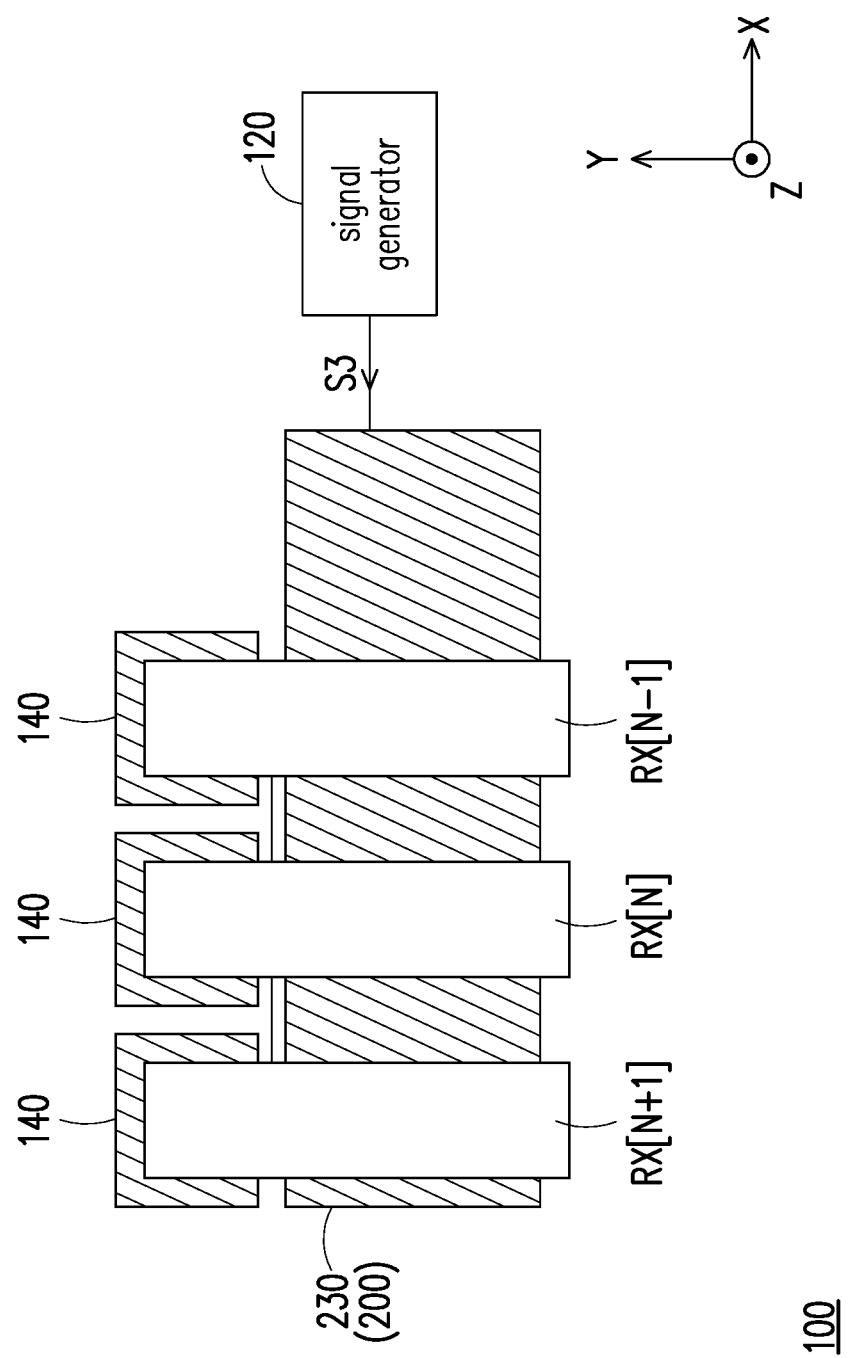
FIG. 9A is a top view illustrating a layer structure of a driver chip according to another embodiment of the invention.
Figure 9B:
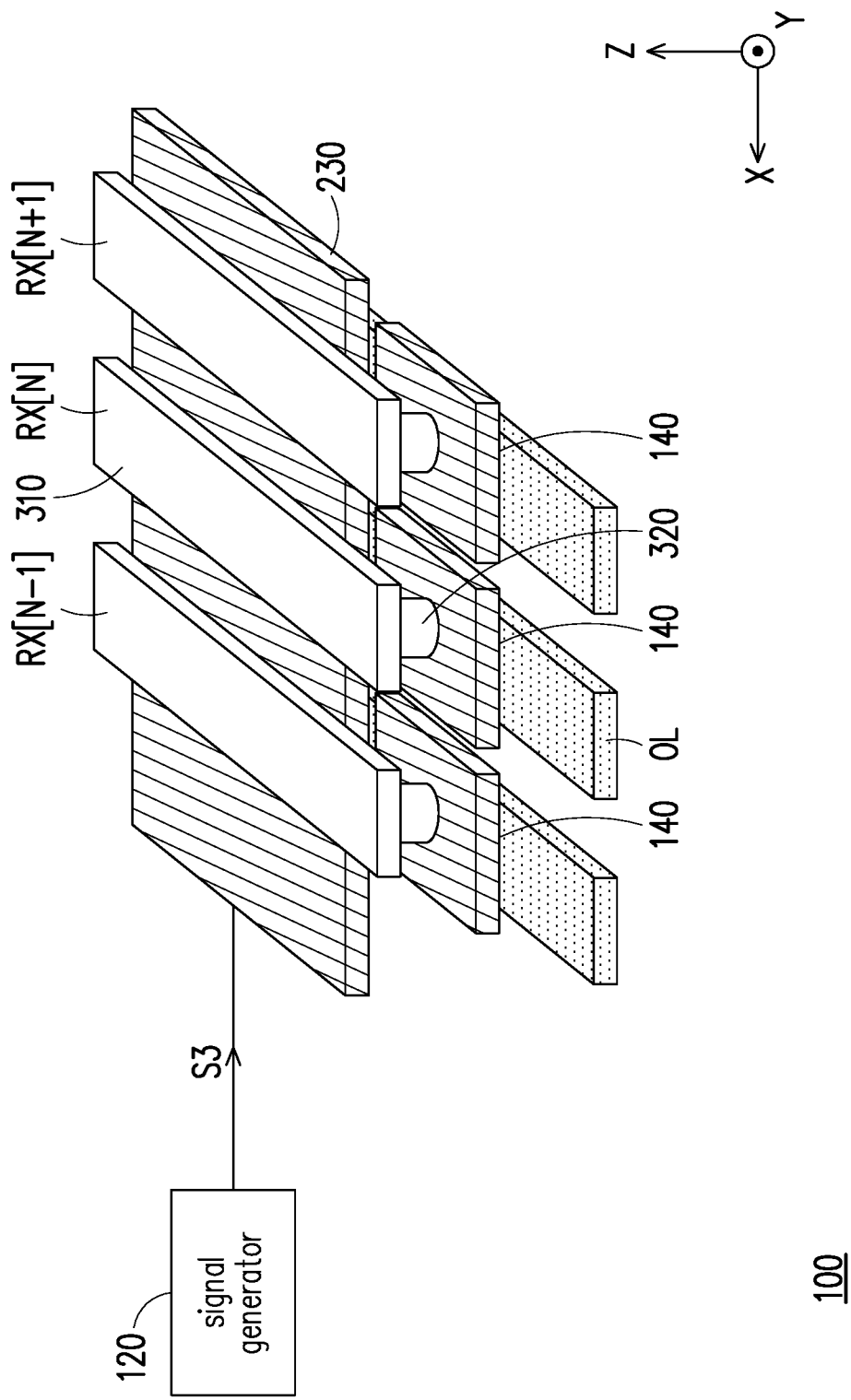
FIG. 9B is a three-dimensional view illustrating the layer structure of the driver chip depicted in FIG. 9A.

FIG. 9A is a top view illustrating a layer structure of a driver chip according to another embodiment of the invention. FIG. 9B is a three-dimensional view illustrating the layer structure of the driver chip depicted in FIG. 9A. Referring to FIG. 9A and FIG. 9B, FIG. 9A and FIG. 9B show one or more such as three receiving terminals RX[N−1], RX[N] and RX[N+1]. The number of the receiving terminals does not intend to limit the invention. Each of the receiving terminals can include a bump 310. Each of the receiving terminals can further include a via 320. Taking the receiving terminal RX[N] for example, the bump 310 is connected to the corresponding sensing line 140 via the via 320. At least one metal line OL may be disposed aside the bump 310. The shielding structure 200 includes a metallic pattern 230, which can be disposed between the bump 310 and the at least one metal line OL. Therefore, the at least one metal line OL and the metallic pattern 230 may be at different metal layers. The metallic pattern 230 and the sensing line 140 may be at the same metal layer as shown. For example, the metallic pattern 230 and the sensing line 140 may be at the same top metal layer. However, in different embodiments, the metallic pattern 230 and the sensing line 140 may be at different metal layers. For example, the sensing line can be at the top metal layer and the metallic pattern 230 can be a layer different from the top metal layer.

In the present embodiment, the touch control circuit 110 and the signal generator 120 respectively apply the driving signal S2 and the synchronization signal S3 for an self-capacitance structure (or a DC signal for a mutual-capacitance structure) to the sensing line 140 and the shielding structure 200, and thus the parasitic capacitor generated between the bump 310 and the at least one metal line OL can be reduced. It is noted that the signal generator 120 can be separated with the touch control circuit 110 or integrated with the touch control circuit 110.

Figure 10A:
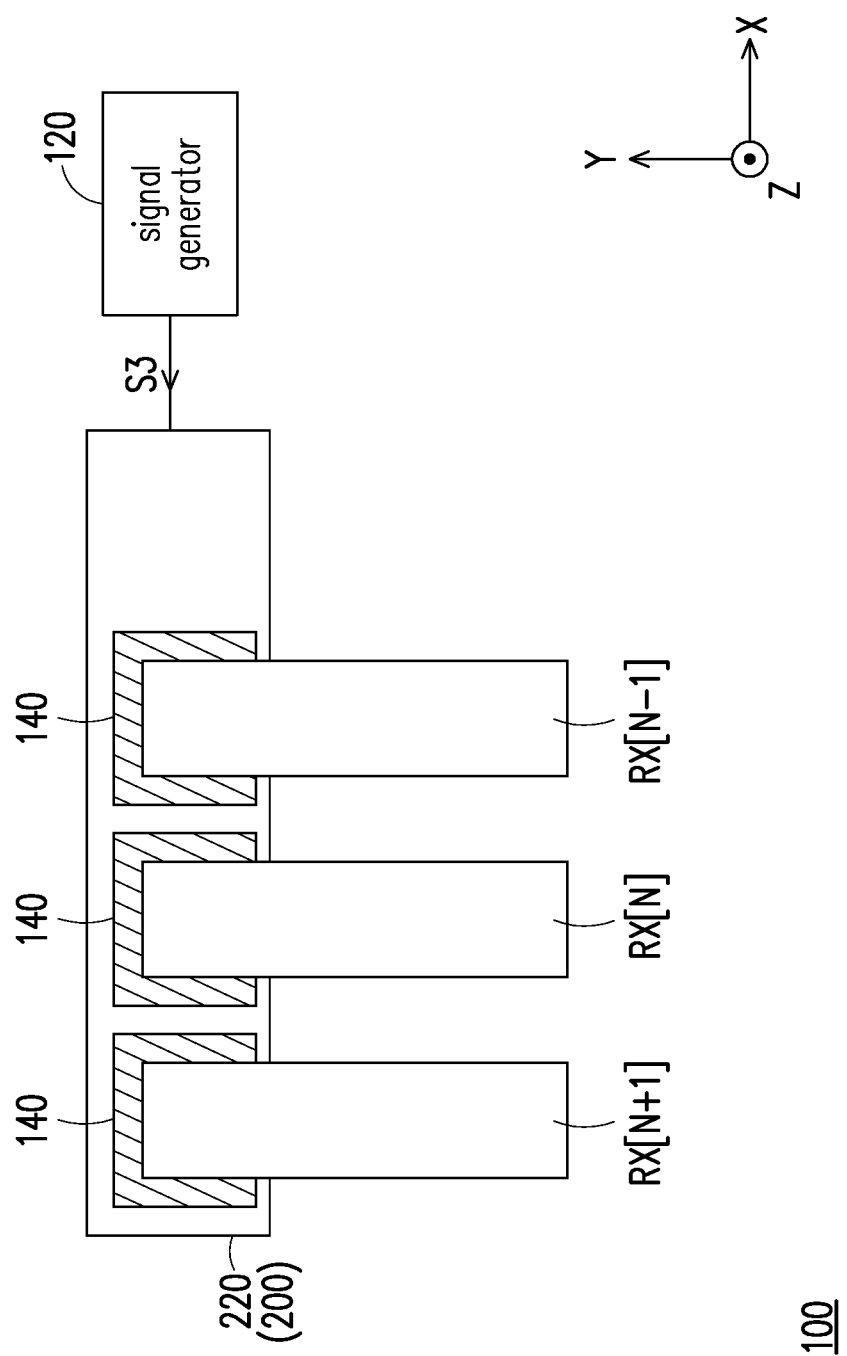
FIG. 10A is a top view illustrating a layer structure of a driver chip according to another embodiment of the invention.
Figure 10B:
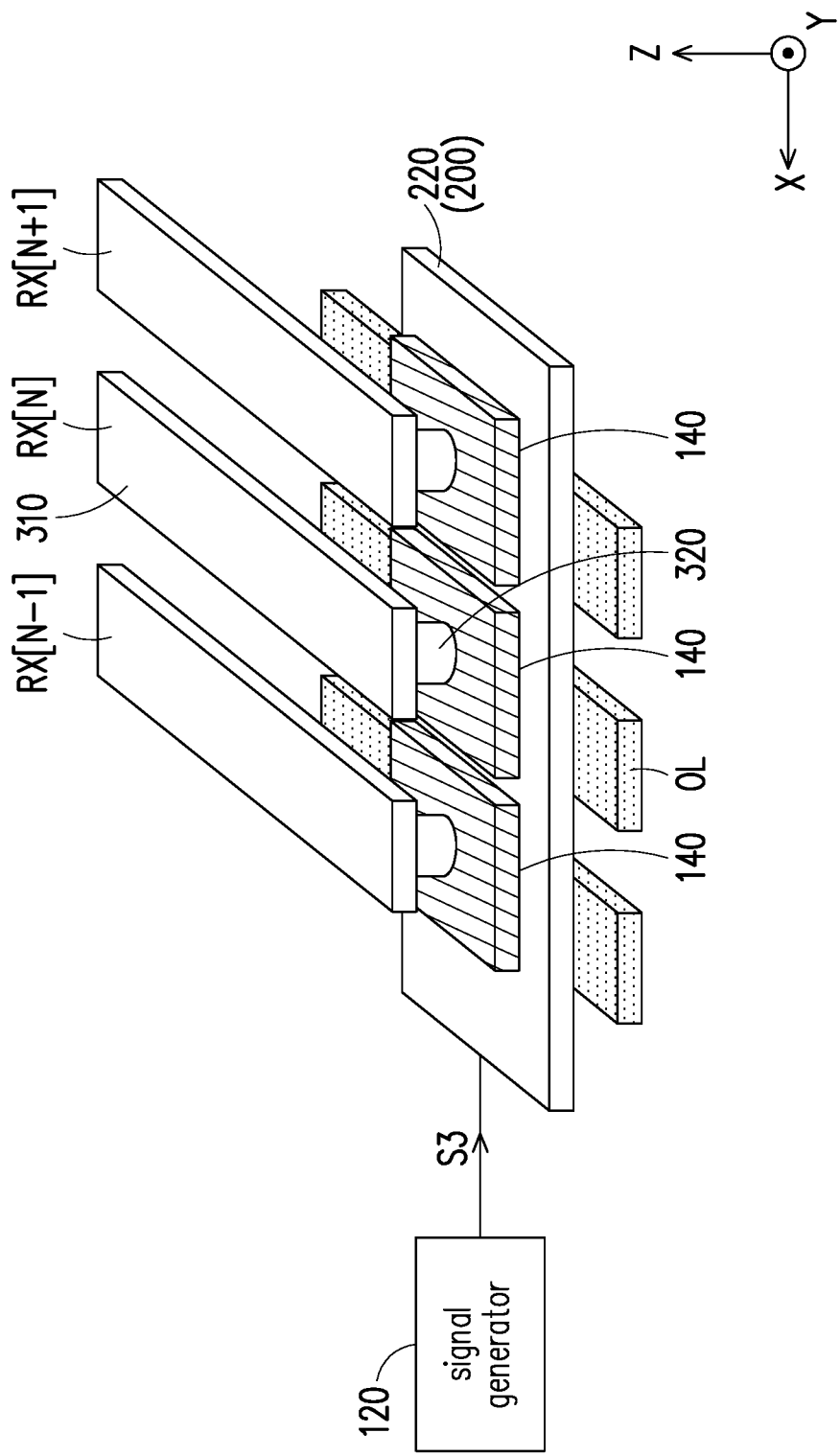
FIG. 10B is a three-dimensional view illustrating the layer structure of the driver chip depicted in FIG. 10A.

FIG. 10A is a top view illustrating a layer structure of a driver chip according to another embodiment of the invention. FIG. 10B is a three-dimensional view illustrating the layer structure of the driver chip depicted in FIG. 10A. Referring to FIG. 10A and FIG. 10B, in the present embodiment, the shielding structure 200 includes a metallic pattern 220 disposed between the sensing line 140 and the at least one metal line OL. Therefore, the sensing line 140 and the metallic pattern 220 can be different metal layers. In the present embodiment, the metallic pattern 220 can be implemented with a first metal layer disposed aside the bump 310, for example, a metal layer below and closest to a top metal layer. In addition, the sensing line 140 can be implemented with a second metal layer such as the top metal layer disposed between the bump 310 and the metallic pattern 220.

In the present embodiment, the touch control circuit 110 and the signal generator 120 respectively apply the driving signal S2 and the synchronization signal S3 for a self-capacitance structure (or the DC signal for a mutual-capacitance structure) to the sensing line 140 and the shielding structure 200, and thus the parasitic capacitor generated between the sensing line 140 and the at least one metal line OL is reduced.

Figure 11A:
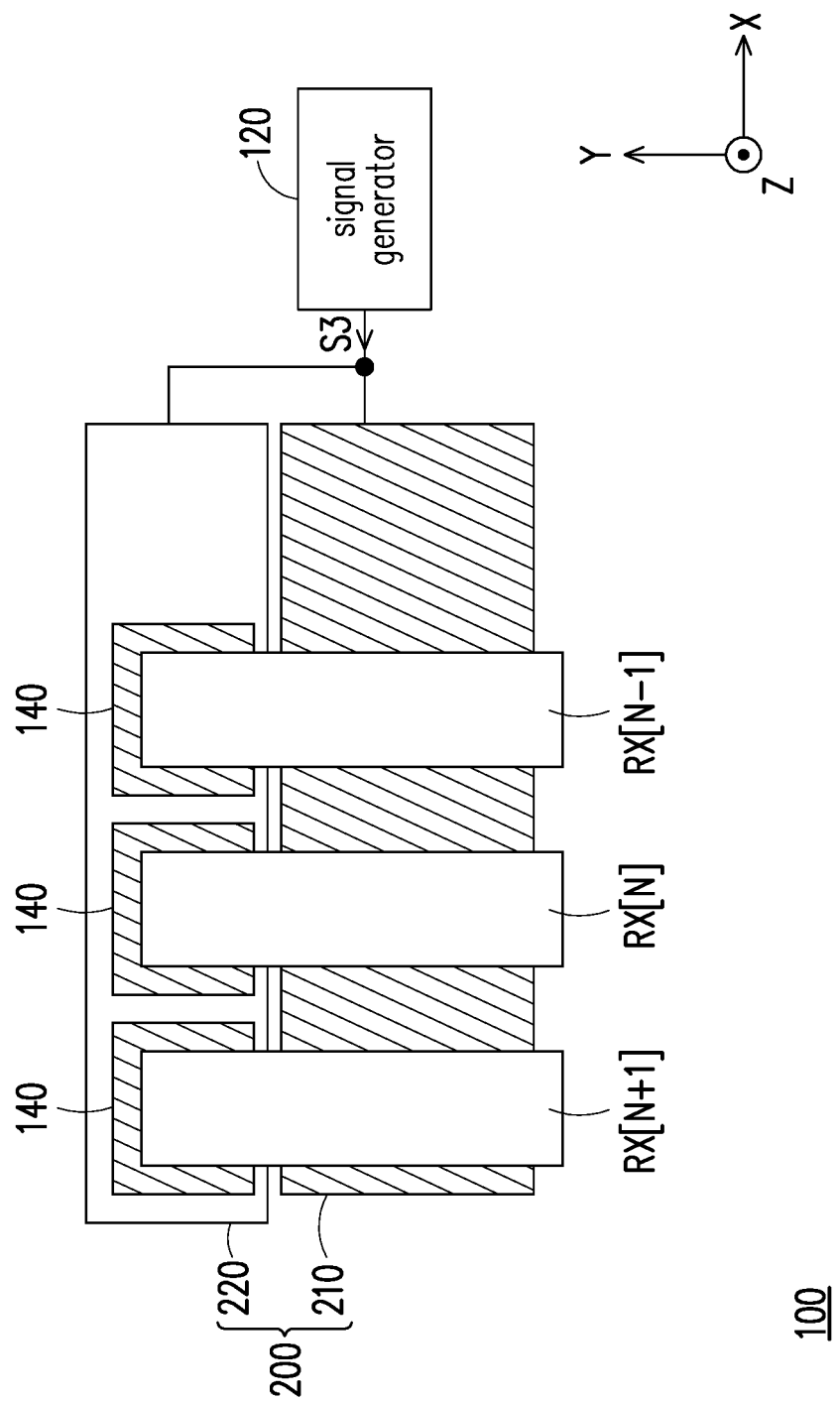
FIG. 11A is a top view illustrating a layer structure of a driver chip according to another embodiment of the invention.
Figure 11B:
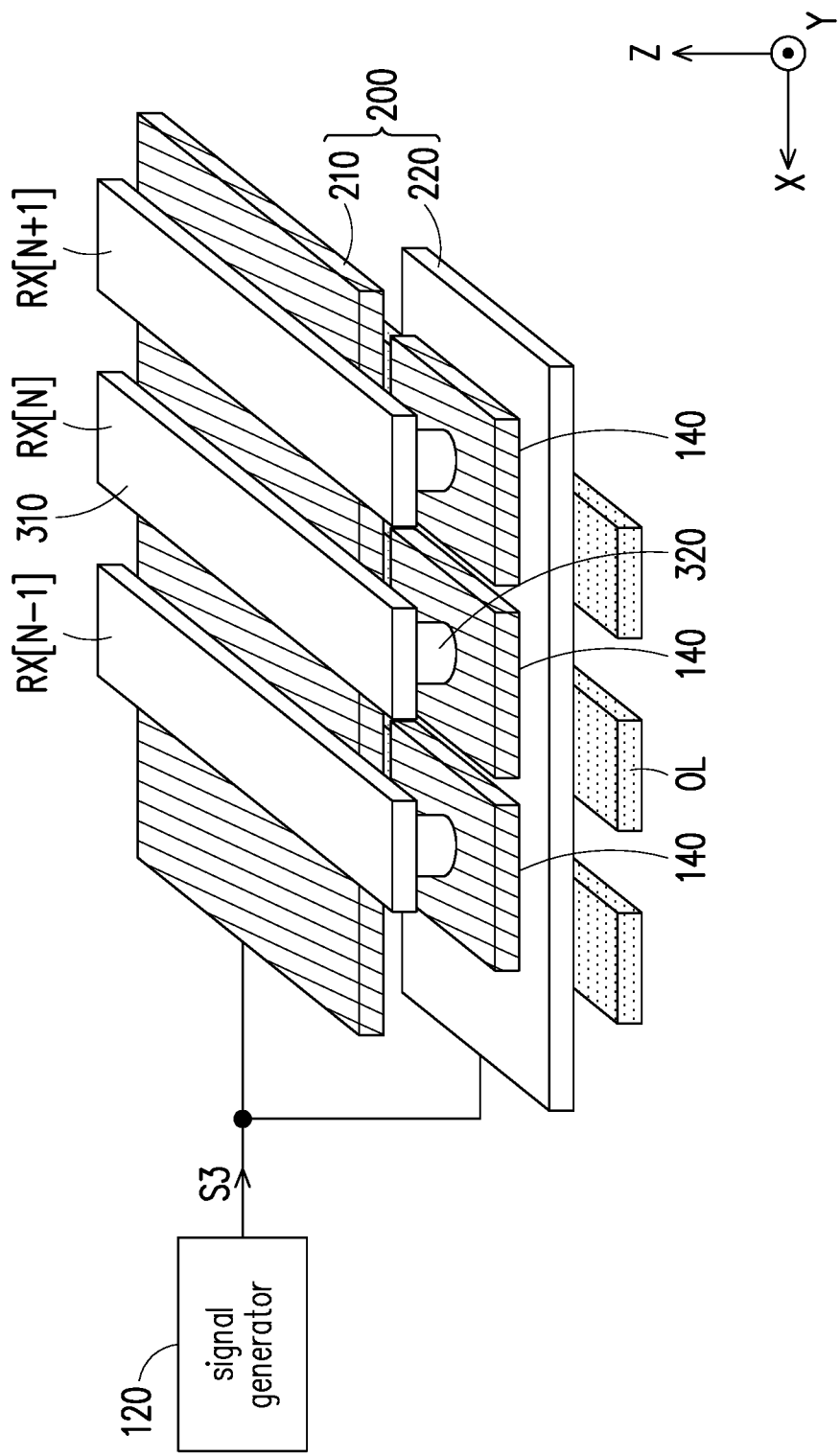
FIG. 11B is a three-dimensional view illustrating the layer structure of the driver chip depicted in FIG. 11A.

FIG. 11A is a top view illustrating a layer structure of a driver chip according to another embodiment of the invention. FIG. 11B is a three-dimensional view illustrating the layer structure of the driver chip depicted in FIG. 11A. FIGS. 11A-11B are embodiments implemented by combining embodiments of FIGS. 9A-9B and FIGS. 10A-10B. Referring to FIG. 11A and FIG. 11B, in the present embodiment, the shielding structure 200 includes a first metallic pattern 220 and a second metallic pattern 210. The first metallic pattern 220 is disposed with a first metal layer disposed aside a first part of the bump 310, for example, a metal layer below and closest to a top metal layer. The second metallic pattern 210 is disposed between a second part of the bump 310 and the metal lines OL. In the present embodiment, the sensing line 140 is also implemented with a second metal layer (for example, the top metal layer). The second metallic pattern 210 can be also implemented with the second metal layer, i.e., the top metal layer, disposed between the first part of the bump 310 and the first metallic pattern 220. Therefore, the at least one metal line OL and the second metallic pattern 210 are different metal layers. Details about the first metallic pattern 220 and the second metallic pattern 210 can be referred to the embodiments of FIGS. 9A-9B and 10A-10B, respectively and are thus omitted.

Figure 12A:
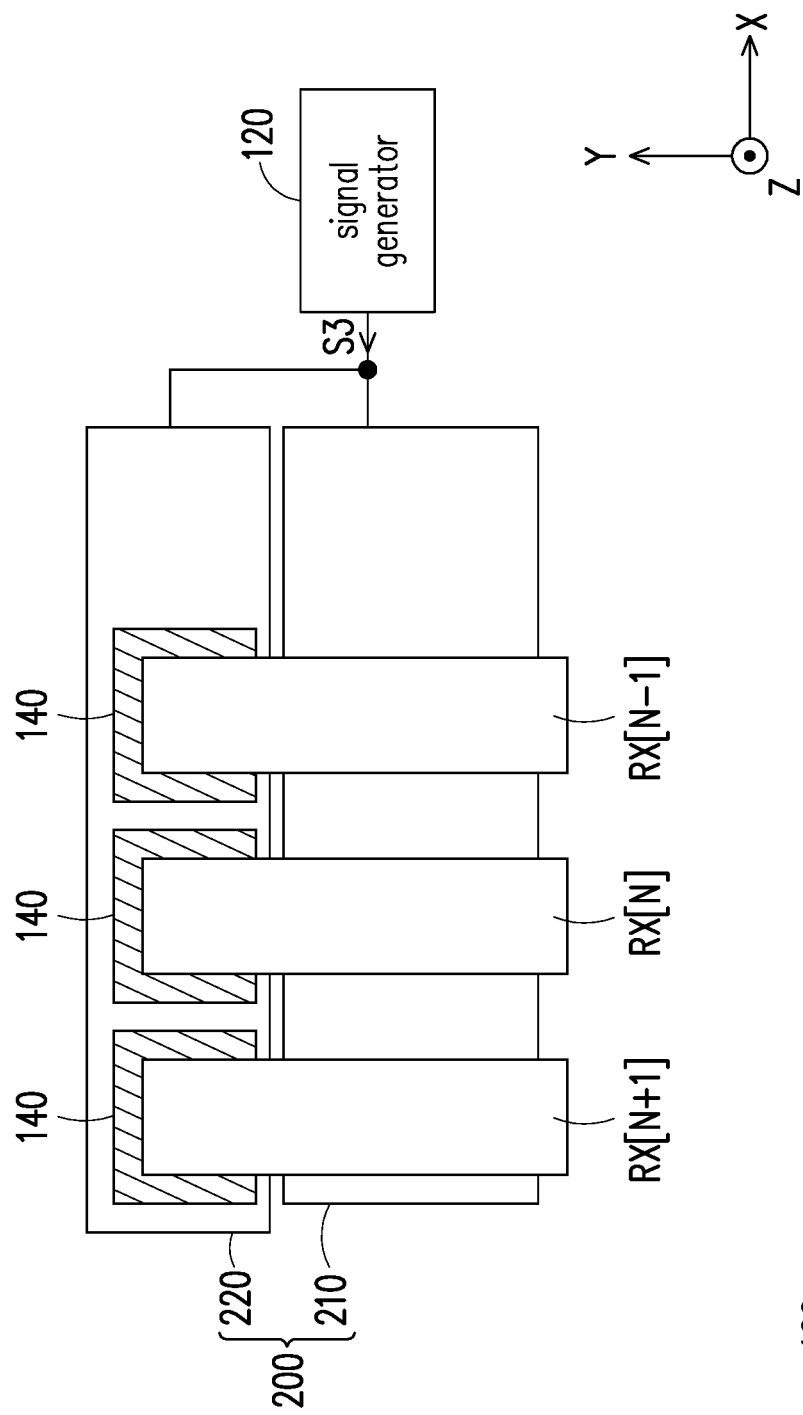
FIG. 12A is a top view illustrating a layer structure of a driver chip according to another embodiment of the invention.
Figure 12B:
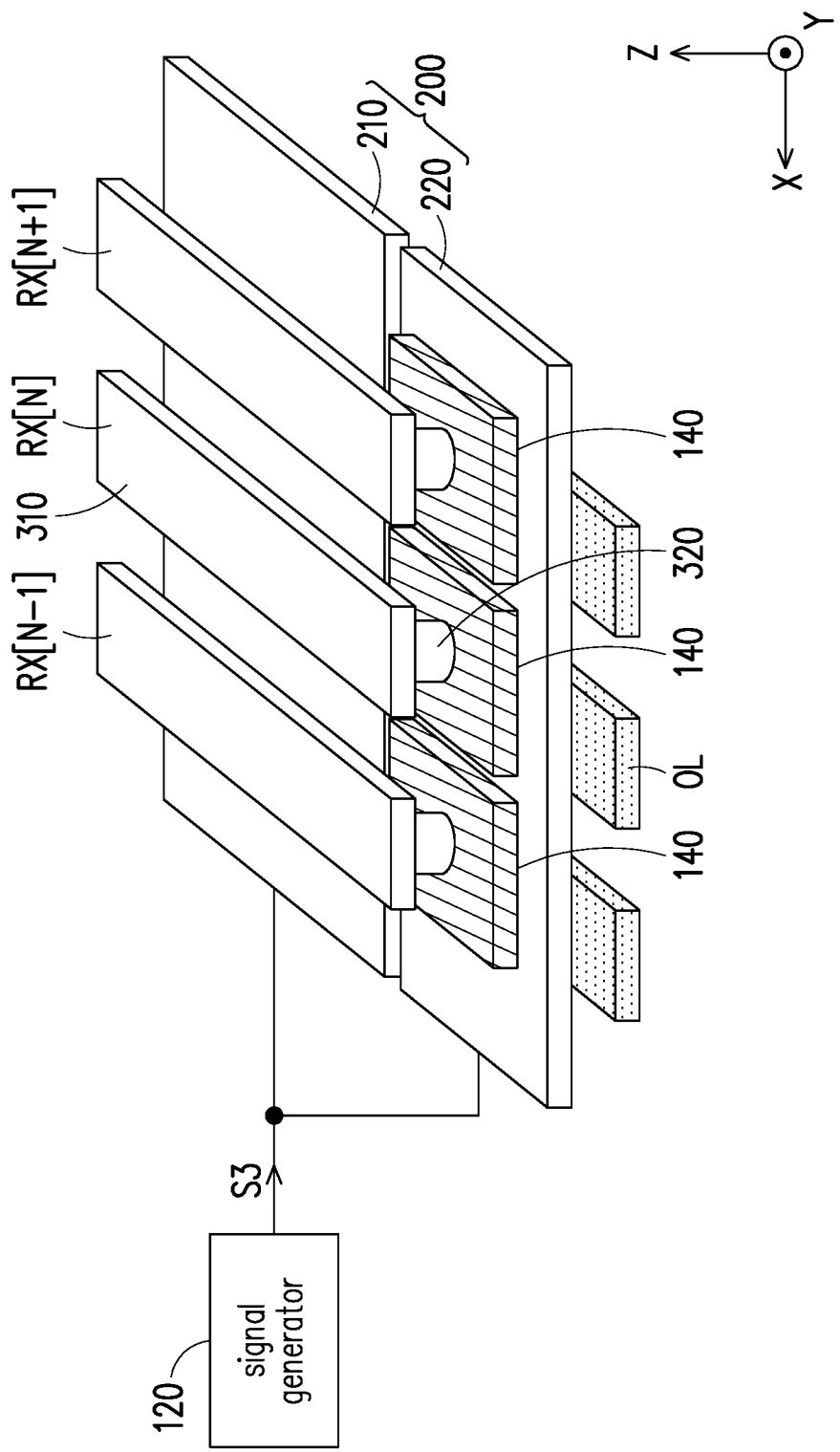
FIG. 12B is a three-dimensional view illustrating the layer structure of the driver chip depicted in FIG. 12A.

FIG. 12A is a top view illustrating a layer structure of a driver chip according to another embodiment of the invention. FIG. 12B is a three-dimensional view illustrating the layer structure of the driver chip depicted in FIG. 12A. FIGS. 12A-12B differ from FIGS. 11A-11B mainly in the layer of second metallic pattern 210, which is modified to be the same layer as the first metallic pattern 220. Referring to FIG. 12A and FIG. 12B, in the present embodiment, the second metallic pattern 210 is implemented with the first metal layer. That is to say, the first metallic pattern 220 and the second metallic pattern 210 are implemented in the same metal layer, for example, a metal layer below and closest to the top metal layer. The sensing line 140 is implemented with a second metal layer, for example, the top metal layer.

Figure 13A:
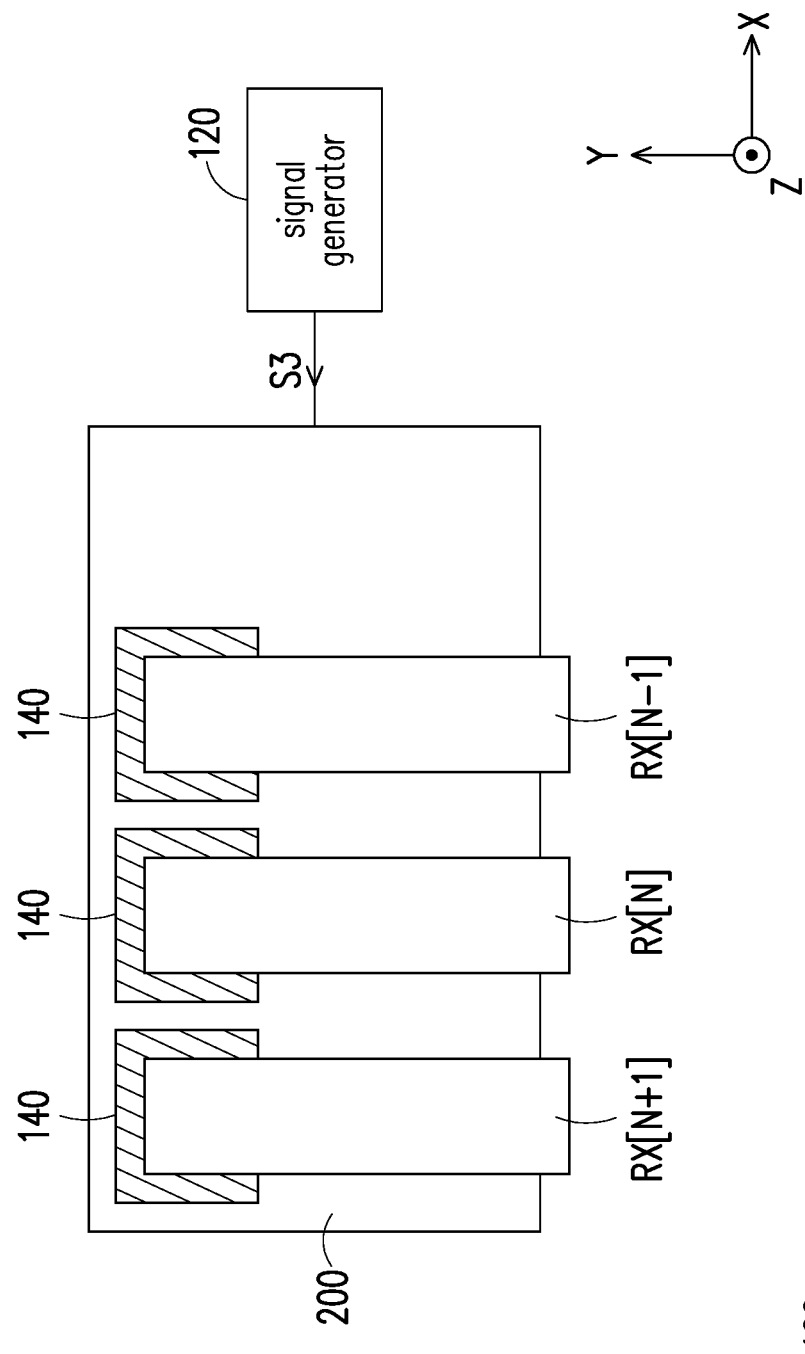
FIG. 13A is a top view illustrating a layer structure of a driver chip according to another embodiment of the invention.
Figure 13B:
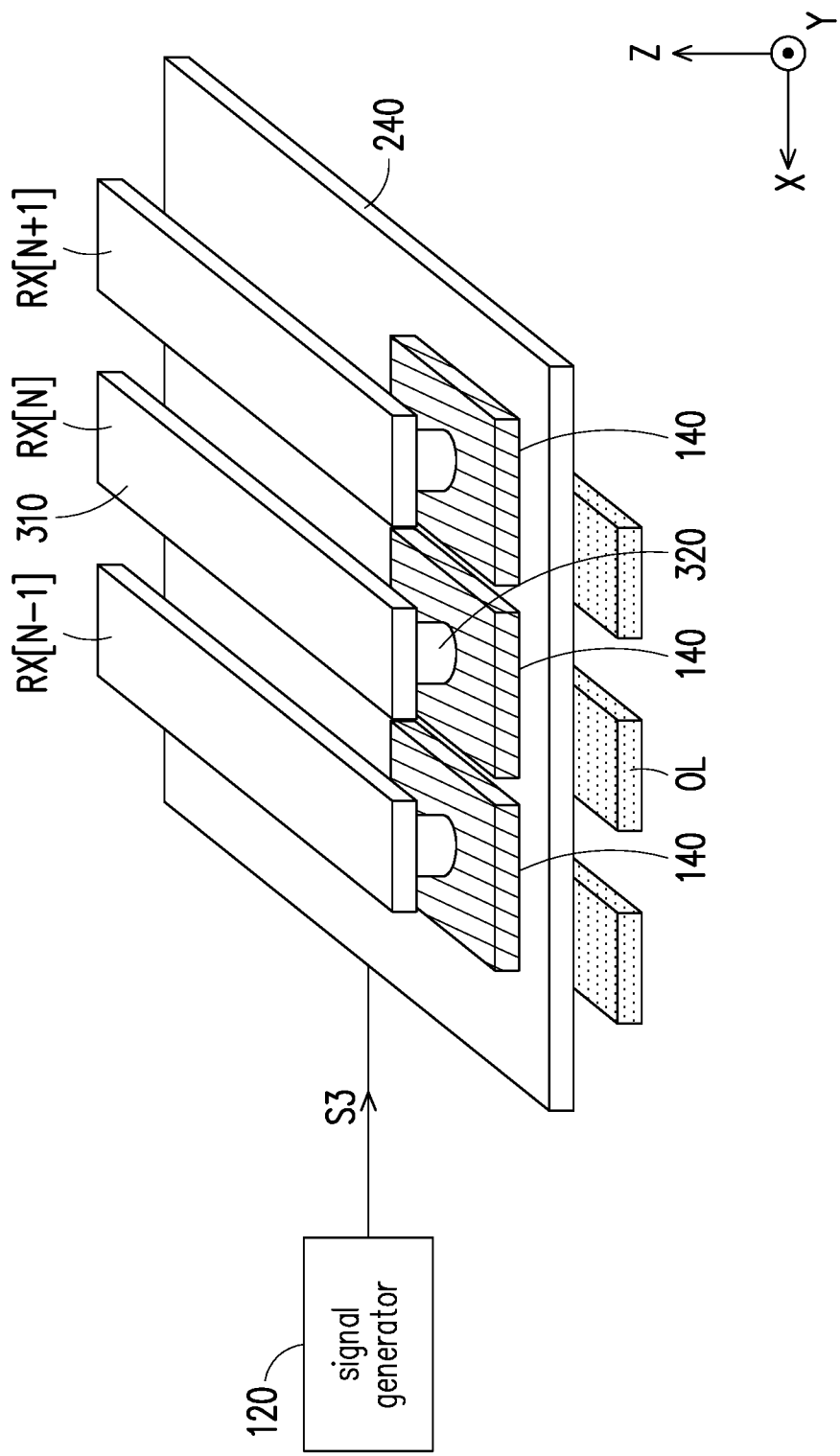
FIG. 13B is a three-dimensional view illustrating the layer structure of the driver chip depicted in FIG. 13A.

FIG. 13A is a top view illustrating a layer structure of a driver chip according to another embodiment of the invention. FIG. 13B is a three-dimensional view illustrating the layer structure of the driver chip depicted in FIG. 13A. FIGS. 13A-13B differ from FIGS. 12A-12B mainly in that the first metallic pattern 220 and the second metallic pattern 210 are combined rather than separated. Referring to FIG. 13A and FIG. 13B, in the present embodiment, the first metallic pattern 220 and the second metallic pattern 210 are combined as a continuous metallic pattern 240.

Figure 14:
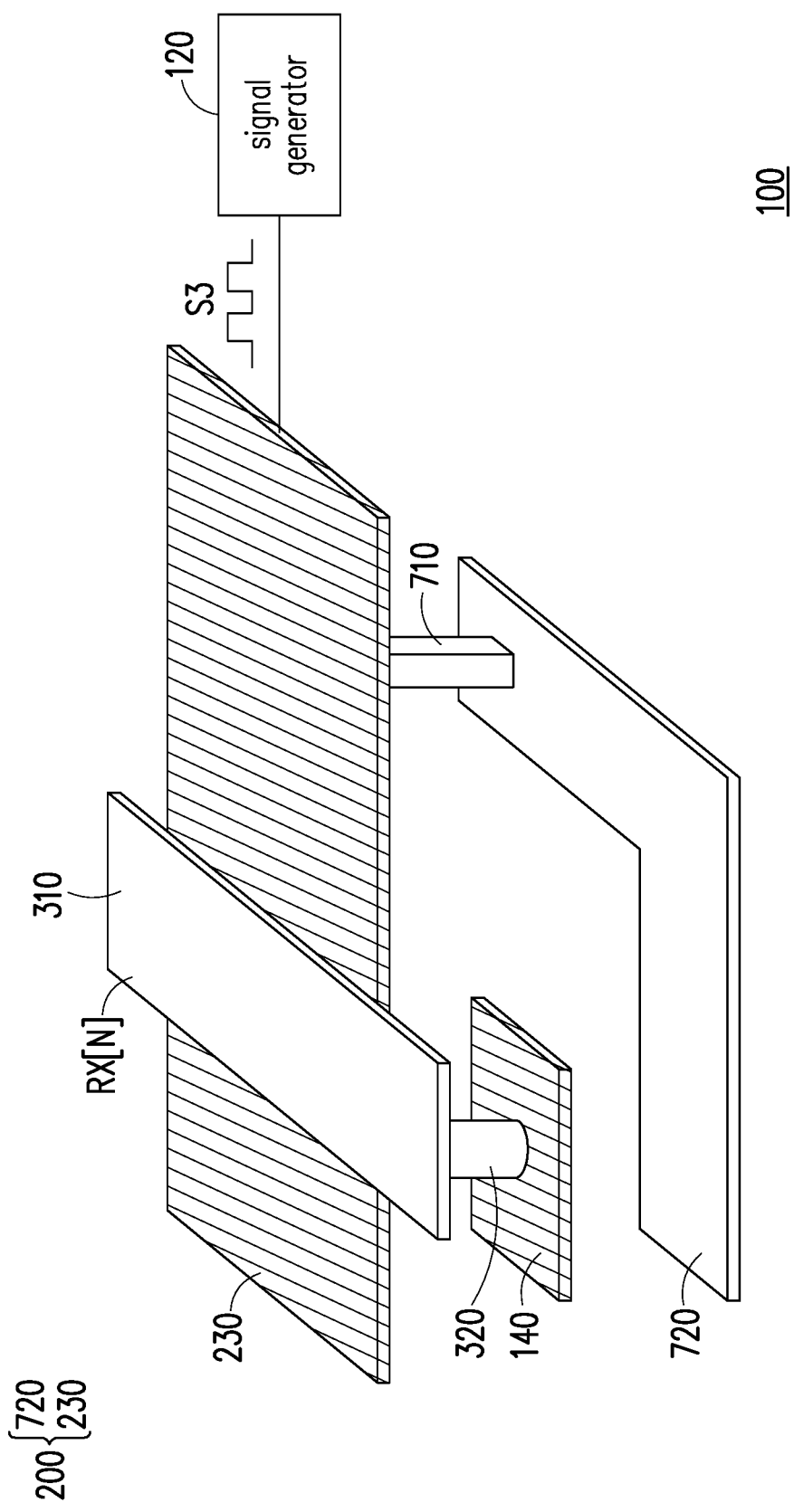
FIG. 14 is a three-dimensional view illustrating a layer structure of a driver chip according to another embodiment of the invention.

FIG. 14 is a three-dimensional view illustrating a layer structure of a driver chip according to another embodiment of the invention. Referring to FIG. 14, in the present embodiment, the shielding structure 200 includes a first metallic pattern 720 and a third metallic pattern 230. The first metallic pattern 720 and the third metallic pattern 230 are connected via the via 710. The first metallic pattern 720 and the sensing line 140 are implemented in different metal layers. The sensing line 140 and the third metallic pattern 230 are implemented in the same metal layer, for example, a top metal layer. The signal generator 120 is configured to apply the synchronization signal S3 to the third metallic pattern 230, and the synchronization signal S3 are transmitted to the first metallic pattern 720 via the via 710 for shielding of parasitic capacitance associated with the sensing line 140 and the bump 310. Alternatively, the signal generator 120 is configured to apply the synchronization signal S3 to the first metallic pattern 720 and the synchronization signal S3 are transmitted to the third metallic pattern 230 via the via 710. Alternatively, the signal generator 120 is configured to apply the synchronization signal to both the first metallic pattern 720 and the third metallic pattern 230 directly by being connected thereto. The synchronization signal is applied for a self-capacitance structure and can be replaced with a DC signal for a mutual-capacitance structure.

Figure 15:
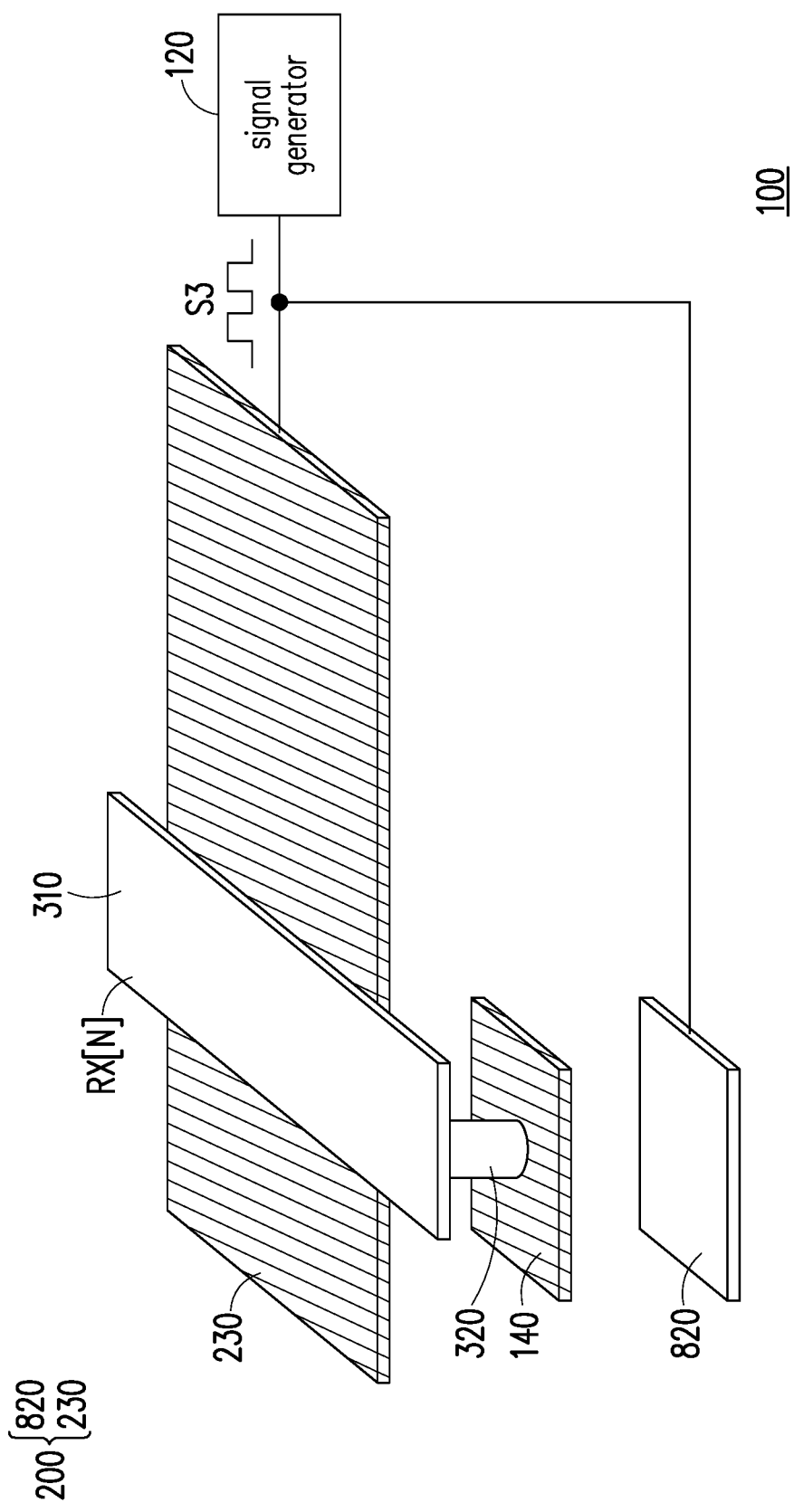
FIG. 15 is a three-dimensional view illustrating a layer structure of a driver chip according to another embodiment of the invention.

FIG. 15 is a three-dimensional view illustrating a layer structure of a driver chip according to another embodiment of the invention. Referring to FIG. 15, in the present embodiment, the first metallic pattern 820 and the third metallic pattern 230 are not connected. The signal generator 120 is configured to respectively apply the synchronization signal S3 to each of the first metallic pattern 820 and the third metallic pattern 230 by being connected thereto for shielding of parasitic capacitance associated with the sensing line 140 and the bump 310. The synchronization signal is applied for a self-capacitance structure and can be replaced with a DC signal for a mutual-capacitance structure.

Figure 16:
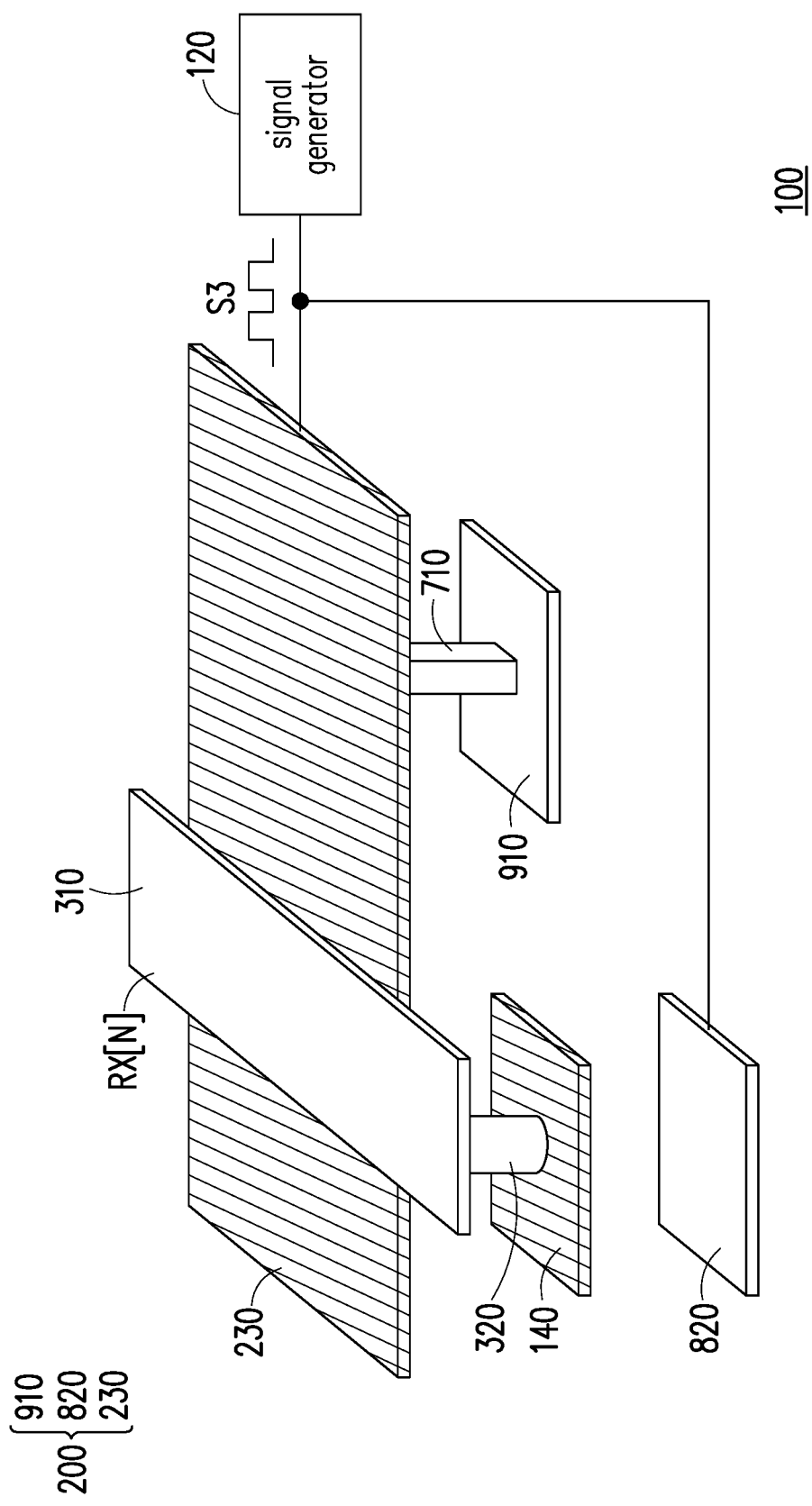
FIG. 16 is a three-dimensional view illustrating a layer structure of a driver chip according to another embodiment of the invention.

FIG. 16 is a three-dimensional view illustrating a layer structure of a driver chip according to another embodiment of the invention. Referring to FIG. 16, in the present embodiment, the shielding structure 200 further includes a second metallic pattern 910. The second metallic pattern 910 and the third metallic pattern 230 are connected via the via 710. The first metallic pattern 720 and the second metallic pattern 910 are implemented in the same metal layer, for example, a top metal layer. For parasitic capacitance shielding, the signal generator 120 is configured to respectively apply the synchronization signal S3 to the first metallic pattern 820 and the third metallic pattern 230. The synchronization signal S3 can be transmitted to the second metallic pattern 910 via the via 710 from the first metallic pattern 820. Alternatively, the signal generator 120 is configured to respectively apply the synchronization signal S3 to the second metallic pattern 910 and the third metallic pattern 230. The synchronization signal S3 can be transmitted to the first metallic pattern 820 via the via 710 from the second metallic pattern 910. Alternatively, the signal generator 120 is configured to respectively apply the synchronization signal S3 to each of the first metallic pattern 820 and the second metallic pattern 910 by being directly connected thereto. The synchronization signal is applied for a self-capacitance structure and can be replaced with a DC signal for a mutual-capacitance structure.

In view of the aforementioned descriptions, the embodiments are directed to a driver chip which may be implemented as a chip configured to drive a touch sensor. The driver chip may include a receiving structure, a shielding structure, and a touch control circuit. The receiving structure can include at least one of a receiving terminal and a sensing line configured for receiving a touch sensing signal. The shielding structure may reduce effects of parasitic capacitances causing the detected capacitance values to be erroneous. The driver chip may further include a signal generator, which may apply a synchronization signal/a DC signal to the shielding structure. Consequently, the driver chip may improve sensing accuracy.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:
1. A driver chip, comprising:
 a receiving structure, configured to receive a touch sensing signal;
 a shielding structure, disposed aside the receiving structure and configured to shield at least one parasitic capacitor within the driver chip and coupled to the receiving structure, wherein the shielding structure is disposed within the driver chip; and
 a touch control circuit, connected to the receiving structure and configured to receive the touch sensing signal from the receiving structure.

2. The driver chip of claim 1, wherein the touch control circuit is further configured to apply a driving signal to the receiving structure.

3. The driver chip of claim 2, further comprising a signal generator, connected to the shielding structure and configured to apply a synchronization signal to the shielding structure, wherein the synchronization signal is synchronous with the driving signal.

4. The driver chip of claim 3, wherein the synchronization signal has a frequency and a phase substantially the same as those of the driving signal different from the receiving structure.

5. The driver chip of claim 1, wherein the touch control circuit is further configured to apply a driving signal to a driving line.

6. The driver chip of claim 5, further comprising a signal generator, connected to the shielding structure and configured to apply a direct-current (DC) signal to the shielding structure.

7. The driver chip of claim 6, wherein the DC signal has a voltage level substantially the same as that of the touch sensing signal.

8. The driver chip of claim 1, wherein the shielding structure comprises at least a part arranged between a first terminal and a second terminal of the parasitic capacitor.

9. The driver chip of claim 8, further comprising:
an interference element,
wherein the interference element is configured to serve as the first terminal of the parasitic capacitor, and the receiving structure is configured to serve as the second terminal of the parasitic capacitor.

10. The driver chip of claim 9, wherein the interference element comprises one of a substrate and at least one metal line other than the sensing line.

11. The driver chip of claim 1 wherein the receiving structure comprises a sensing line, configured to transmit the touch sensing signal to the touch control circuit.

12. The driver chip of claim 11 wherein the shielding structure comprises:
a first metallic pattern disposed on one side of the sensing line.

13. The driver chip of claim 12, further comprising a substrate wherein the first metallic pattern is disposed between the sensing line and the substrate.

14. The driver chip of claim 13, wherein the first metallic pattern is implemented by a first metal layer closest to the substrate.

15. The driver chip of claim 12, further comprising at least one metal line wherein the first metallic pattern is disposed between the sensing line and the at least one metal line.

16. The driver chip of claim 12, further comprising at least one metal line, each disposed between the sensing line and the first metallic pattern and implemented as a different metal layer from that of the first metallic pattern.

17. The driver chip of claim 16, wherein the at least one metal line is applied with a signal having the same frequency and the same phase as a driving signal.

18. The driver chip of claim 16, wherein the at least one metal line comprise a data line configured to transmit display data for driving a display panel or a touch display panel to display images.

19. The driver chip of claim 12, wherein the shielding structure further comprises:
a second metallic pattern disposed on the other side of the sensing line.

20. The driver chip of claim 19, further comprising at least one metal line, each disposed between the sensing lines and one of the first metallic pattern and the second metallic pattern and implemented as different metal layers from the first metallic pattern and the second metallic pattern.

21. The driver chip of claim 20, wherein the at least one metal line is applied with a signal having the same frequency and the same phase as a driving signal.

22. The driver chip of claim 20, wherein the at least one metal line comprise a data line configured to transmit display data for driving a display panel or a touch display panel to display images.

23. The driver chip of claim 19, further comprising a third metallic pattern connected to the first metallic pattern by a first via and connected to the second metallic pattern by a second via.

24. The driver chip of claim 23, wherein the third metallic pattern and the sensing line are disposed in the same layer.

25. The driver chip of claim 1, wherein the receiving structure comprises a receiving terminal configured to be coupled to a touch sensor external to the driver chip and receive the touch sensing signal from the touch sensor.

26. The driver chip of claim 25, wherein the receiving structure comprises a receiving terminal including a bump.

27. The driver chip of claim 26, wherein the shielding structure further comprises a metallic pattern disposed with a first metal layer disposed aside the bump, and the sensing line is implemented with a second metal layer disposed between the bump and the metallic pattern.

28. The driver chip of claim 26, further comprising at least one metal line disposed aside the bump, wherein the shielding structure further comprises a metallic pattern disposed between the bump and the at least one metal line, and the at least one metal line and the metallic pattern are different metal layers.

29. The driver chip of claim 26, further comprising at least one metal line disposed aside the bump, wherein the shielding structure further comprises:
a first metallic pattern disposed with a first metal layer disposed aside a first part of the bump, wherein the sensing line is implemented with a second metal layer disposed between the first part of the bump and the first metallic pattern; and
a second metallic pattern disposed between a second part of the bump and the metal lines, wherein the at least one metal line and the second metallic pattern are different metal layers.

30. The driver chip of claim 29, wherein the second metallic pattern is implemented with the second metal layer.

31. The driver chip of claim 29, wherein the second metallic pattern is implemented with the first metal layer.

32. The driver chip of claim 29, wherein the first metallic pattern and the second metallic pattern are combined as a continuous metallic pattern.

33. An electronic device, comprising
a touch sensor; and
a driver chip, coupled to the touch sensor and comprising:
a receiving structure, configured to receive a touch sensing signal;
a shielding structure, disposed aside the receiving structure and configured to shield at least one parasitic capacitor within the driver chip and coupled to the receiving structure, wherein the shielding structure is disposed within the driver chip; and
a touch control circuit, connected to the receiving structure and configured to receive the touch sensing signal from the receiving structure.

34. The electronic device of claim 33, further comprising a display panel coupled to the driver chip, wherein the driver chip further comprises a display driver circuit configured to control the display panel to display images.

35. The electronic device of claim 34, wherein the display panel is a touch display panel comprising the touch sensor.

* * * * *